(12) United States Patent
Takahashi

(10) Patent No.: US 7,508,150 B2
(45) Date of Patent: Mar. 24, 2009

(54) ELECTRIC MOTOR CONTROLLER

(75) Inventor: Tomohiro Takahashi, Toyota (JP)

(73) Assignee: OMRON Corporation, Kyoto (JP)

( * ) Notice: Subject to any disclaimer, the term of this patent is extended or adjusted under 35 U.S.C. 154(b) by 251 days.

(21) Appl. No.: 11/704,118

(22) Filed: Feb. 8, 2007

(65) Prior Publication Data
US 2007/0201843 A1   Aug. 30, 2007

(30) Foreign Application Priority Data
Feb. 24, 2006   (JP) ............... 2006-047900

(51) Int. Cl.
*G05B 5/00* (2006.01)
*H02H 7/08* (2006.01)
*H02P 1/00* (2006.01)
*H02P 3/00* (2006.01)
*H02P 7/00* (2006.01)

(52) U.S. Cl. .................. 318/449; 318/445; 318/456; 318/461; 388/806

(58) Field of Classification Search .......... 318/449, 318/445, 456, 461; 388/806
See application file for complete search history.

(56) References Cited

U.S. PATENT DOCUMENTS

2001/0000294 A1* 4/2001 Kitamura .......... 318/445
2003/0025471 A1* 2/2003 Igarashi et al. ......... 318/461
2007/0222877 A1* 9/2007 Kurane ............... 348/294

FOREIGN PATENT DOCUMENTS

JP   3553276   5/2004

* cited by examiner

Primary Examiner—Walter Benson
Assistant Examiner—Erick Glass
(74) Attorney, Agent, or Firm—Osha • Liang LLP

(57) ABSTRACT

The rotational speed of a motor is detected, and stored in a rotational speed memory. The difference between the present rotational speed output and each of plural past rotational speeds stored in the rotational speed memory is calculated in a plural difference calculator. Whether the difference between the present rotational speed and the most past rotational speed out of the plural differences is larger than a first threshold value is judged. Whether at least one of the differences is larger than a second threshold value is judged. The first and second threshold values are set to values for detecting that the rotational speed of the motor has a decelerating trend through the comparison with the differences concerned, and the first threshold value is set to be smaller than the second threshold value. When both judgments have positive judgment results, it is judged that rotation abnormality of the motor occurs.

5 Claims, 19 Drawing Sheets v: MOTOR ROTATIONAL SPEED
y(n-8): DIFFERENCE OF ROTATIONAL SPEED (INTERVAL 8)
y(n-13): DIFFERENCE OF ROTATIONAL SPEED (INTERVAL 13)
y(n-18): DIFFERENCE OF ROTATIONAL SPEED (INTERVAL 18)
A: FIRST THRESHOLD VALUE
B: SECOND THRESHOLD VALUE
P: WHEN PINCH ABNORMALITY OCCURS
Q: WHEN PINCH ABNORMALITY IS DETECTED

PINCH ABNORMALITY DETECTING CONDITION
· y (n-8) > A, y (n-13) > A, AND y (n-18) > A
· y (n-8) > B, y (n-13) > B, OR y (n-18) > B v: MOTOR ROTATIONAL SPEED
$y_{(n-18)(n-8)}$: DIFFERENCE OF ROTATIONAL SPEED (18 TIMES BEFORE AND 8 TIMES BEFORE)
$y_{(n-18)n}$: DIFFERENCE OF ROTATIONAL SPEED (PRESENT AND 18 TIMES BEFORE)
A: FIRST THRESHOLD VALUE
B: SECOND THRESHOLD VALUE
P: WHEN PINCH ABNORMALITY OCCURS
R: WHEN PINCH ABNORMALITY IS DETECTED

PINCH ABNORMALITY DETECTING CONDITION
· $y_{(n-18)(n-8)} > A$, AND $y_{(n-18)n} > A$
· $y_{(n-18)(n-8)} > B$, OR $y_{(n-18)n} > B$

ELECTRIC MOTOR CONTROLLER

BACKGROUND OF THE INVENTION

1. Field of the Invention

The present invention relates to an electric motor controller for controlling an electric motor that drives an opening/closing member for a vehicle, for example.

2. Background Art

For example, a vehicle is provided with opening/closing members such as door windows, a sun roof, slide doors, etc., and electric motors for driving these opening/closing members, and electric motor controllers for controlling the electric motors. In these electric motor controllers, a controller for controlling an electric motor for opening/closing a window is called as a power window device (or window opening/closing controller). The power window device generally rotates a motor serving as an electric motor forwardly or reversely upon operation of a switch to upwardly or downwardly move the window glass of a door, thereby opening/closing the window.

FIG. 1 is a block diagram showing the electrical construction of the power window device. 1 represents an operation switch for opening/closing a window, 2 represents a motor driving circuit for driving a motor 3, 4 represents a rotary encoder for outputting pulses synchronous with the rotation of the motor 3, 5 represents a pulse detecting circuit for detecting pulses output from the rotary encoder 4, 6 represents a memory constructed by ROM, RAM or the like, and 8 represents a controller constructed by CPU for controlling the opening/closing operation of the window and a memory.

Upon operating the operation switch 1, a window opening/closing instruction is given to the controller 8, and the motor 3 is forwardly or reversely rotated by the motor driving circuit 2. By the rotation of the motor 3, a window opening/closing mechanism interlocked with the motor 3 is actuated to open/close the window. The pulse detecting circuit 5 detects pulses output from the rotary encoder 4, and the controller 8 calculates the open/close amount of the window and the rotational speed of the motor on the basis of the detection result and controls the rotation of the motor 3 through the motor driving circuit 2.

FIG. 2 is a diagram showing the construction of an sample of the operation switch 1. The operation switch 1 comprises an operation knob 11 that is rotatable around the axis Q in the direction of ab, a rod 12 provided integrally with the operation knob 11, and a well-known slide switch 13. 14 represents an actuator of the slide switch 13, and 20 represents a cover of a switch unit in which the operation switch 1 is installed. The lower end of the rod 12 is fitted to the actuator 14 of the slide switch 13. When the operation knob 11 is rotated in the direction of ab, the actuator 14 is moved in a direction of cd through the rod 12, and the contact point (not shown) of the slide switch 13 is switched in accordance with the movement position of the actuator 14.

The operation knob 11 is switchable to each of an auto-close AC position, a manual-close MC position, a neutral N position, a manual-open MO position and an auto-open AO position. FIG. 2 shows a state where the operation knob 11 is located at the neutral position N. When the operation knob 11 is rotated from this position in the direction of a by a fixed amount and set to the manual-close MC position, a manual-close operation under which the window is manually closed is carried out. When the operation knob 11 is further rotated from the above position in the direction of a and set to the auto-close AC position, an auto-close operation under which the window is automatically closed is carried out. Furthermore, when the operation knob 11 is rotated from the neutral N position in the direction of b by a fixed amount and set to the manual-open MO position, a manual-open operation under which the window is manually opened is carried out. When the operation knob 11 is further rotated from the above position in the direction of b and set to the auto-open AO position, an auto-open operation under which the window is automatically opened is carried out. The operation knob 11 is provided with a spring (not shown), and when a hand is released from the rotated operation knob 11, the operation knob 11 is returned to the neutral N position by the force of the spring.

In the case of the manual operation, the window closing or opening operation is carried out during only the time period when the operation knob 11 is continued to be held at the manual-close MC or manual-open MO position by a hand. When the hand is released from the knob 11 and thus the knob is returned to the neutral position N, the window closing or opening operation is stopped. On the other hand, in the case of the automatic operation, once the operation knob 11 is rotated to the auto-close AC or auto-open AO position, the window closing or opening operation is subsequently continuously carried out even when the hand is released from the operation knob 11 and thus the knob is returned to the neutral N position.

FIG. 3 is a diagram showing an example of the window opening/closing mechanism provided to each window of the vehicle. 100 represents a window, 101 represents a window glass that opens/closes the window 100, 102 represents an X arm type window opening/closing mechanism. The window glass 101 is upwardly and downwardly moved by actuation of the window opening/closing mechanism 102. The upward movement of the window glass 101 closes the window 100, and the downward movement of the window glass 101 opens the window 100. In the window opening/closing mechanism 102, 103 represents a support member secured to the lower end of the window glass 101. 104 represents a first arm one end of which is fitted to a support member 103 and the other end of which is rotatably supported by a bracket 106, and 105 represents a second arm one end of which is fitted to the support member 103 and the other end of which is fitted to a guide member 107. The first arm 104 and the second arm 105 are connected to each other at the intermediate portions thereof through a shaft. 3 represents the motor described above, and 4 represents the rotary encoder described above. The rotary encoder 4 is connected to the rotational shaft of the motor 3, and outputs pulses whose number is proportional to the rotation amount of the motor 3. The number of pulses output from the rotary encoder 4 within a predetermined time is counted, whereby the rotational speed of the motor 3 can be detected. Furthermore, the rotation amount of the motor 3 (the movement amount of the window glass 101) can be calculated from the output of the rotary encoder 4.

109 represents a pinion rotated by the motor 3, and 110 represents a fan-shaped gear that is engaged with the pinion 109 and rotated. The gear 110 is fixed to the first arm 104. The motor 3 is rotatable in forward and reverse directions, and rotates the pinion 109 and the gear 110 by the rotation thereof in the forward and reverse directions, so that the first arm 104 is rotated in the forward and reverse directions. Following this rotation, the other end of the second arm 105 is slid in the lateral direction along the groove of the guide member 107, and the support member 103 is moved in the vertical direction to upwardly and downwardly the window glass 101, so that the window 100 is opened and closed.

The power window device as described above has a function of detecting sticking of an object when the auto-close operation is carried out under the state that the operation knob 11 is located at the auto-close AC position of FIG. 2 or when the manual-close operation is carried out under the state that the operation knob 11 is located at the manual-close MC position. That is, as shown in FIG. 4, when an object Z is stuck in a gap of the window glass 101 during the closing operation of the window 100, the sticking is detected to stop the closing operation of the window 100 or switch the closing operation to the opening operation. Particularly, the window 100 is automatically closed during the auto-close operation, and thus when a hand or a neck is erroneously stuck, it is necessary to prohibit the closing operation and prevent a human body from being injured. Therefore, such a sticking detecting function is provided. When sticking is detected, for example, the rotational speed of the motor 3 which corresponds to the output of the pulse detecting circuit 5 is read by the controller 8 as needed, the present rotational speed and the previous rotational speed are compared with each other, and the presence or absence of rotation abnormality of the motor 3 is judged on the basis of the comparison result, thereby judging the presence or absence of the sticking from the judging result. Specifically, when the object Z is stuck in the window 100, there occurs such abnormality that the load of the motor 3 is rapidly increased and the rotational speed is rapidly reduced, and the difference between the present rotational speed and the previous rotational speed is increased. Therefore, when the difference exceeds a threshold value, it is judged that the rotation abnormality of the motor 3 and sticking occur. Furthermore, even when the rotational speed of the motor 3 is pulsated (varies upwardly and downwardly) due to disturbance such as vibration or the like when the vehicle runs on a bad road, in order to make no erroneous judgment as to sticking and also reduce the sticking detection load and thus deaden a pain when stuck, the difference between the present rotational speed and each of plural different past rotational speeds is calculated, and when all the differences exceed a threshold value, occurrence of sticking is judged (see U.S. Pat. No. 3,553,276 (Patent Document 1), for example).

If it is judged that rotation abnormality of the motor 3 occurs when all the differences of the present rotational speed and the plural past rotational speeds exceed the threshold value as in the case of the related art, the erroneous detection of the rotation abnormality due to the effect of disturbance can be reduced. However, when rotation abnormality of the motor 3 due to sticking of the object Z in the window 100 occurs, it takes much time to detect the rotation abnormality concerned because the processing waits until all the differences exceed the threshold value. When the detection of the rotation abnormality of the motor 3 due to sticking is late, the stop of the motor 3 or the control of the reverse rotation is delayed, so that the closing operation of the window 100 is not prohibited and thus the probability that a human body is injured is increased.

SUMMARY OF THE INVENTION

Therefore, the present invention has an object to provide an electric motor controller that can accurately and rapidly detect rotation abnormality of an electric motor.

In order to solve the above problem, an electric motor controller according to a first invention comprises: detecting means for detecting the rotational speed of an electric motor; storage means for storing the rotational speed detected by the detecting means; calculating means for calculating the difference between the present rotational speed output from the detecting means and plural past rotational speeds stored in the storage means; first judging means for judging whether the difference between the present rotational speed and the most past rotational speed that is calculated by the calculating means is larger than a first threshold value; second judging means for judging whether at least one of plural differences calculated by the calculating means is larger than a second threshold value; third judging means for judging on the basis of the judgment results of the first judging means and the second judging means whether rotation abnormality occurs in the electric motor; and control means for controlling the electric motor in accordance with the judgment result of the third judging means, wherein the first threshold value and the second threshold value are values for detecting a deceleration trend of the rotational speed of the electric motor, the first threshold value is set to be smaller than the second threshold value, and when both the first judging means and the second judging means make positive judgments, the third judging means judges that rotation abnormality occurs in the electric motor.

Accordingly, the difference between the present rotational speed and each of the plural past rotational speeds is varied in accordance with the variation of the rotational speed of the electric motor, and the reaction of the difference concerned to the variation of the rotational speed is later as the past rotational speed is older. That is, the reaction of the difference between the present rotational speed and the most past rotational speed is latest. Therefore, when the rotational speed of the electric motor is temporarily decelerated due to the effect of disturbance, the respective differences vary so as to approach to the first threshold value and the second threshold value while displaced from one another and then immediately separate from them. Therefore, there does not occur any case where the difference between the present rotational speed and the most past rotational speed is larger than the first threshold value and at least one of the differences is larger than the second threshold value, so that the erroneous detection of the rotation abnormality of the electric motor can be prevented. Furthermore, when the rotational speed of the electric motor is continuously decelerated without any effect of disturbance, the respective differences are continuously vary so as to approach to the first threshold value and the second threshold value while displaced from one another. Therefore, the difference between the present rotational speed and the most past rotational speed is larger than the first threshold value, and at least one of the differences is larger than the second threshold value, so that the rotation abnormality of the electric motor can be surely detected. Furthermore, two different threshold values are provided to detect the deceleration trend of the rotational speed of the electric motor, and it is judged that rotation abnormality occurs in the electric motor when the difference between the present rotational speed having late reaction and the most past rotational speed is larger than the smaller first threshold value, and also at least one of the differences is larger than the larger second threshold value. Therefore, the rotation abnormality of the electric motor can be more rapidly detected as compared with the case where occurrence of rotation abnormality is judged when all the differences exceed the threshold value as in the case of the related art.

Furthermore, an electric controller according to a second invention comprises: detecting means for detecting the rotational speed of an electric motor; storage means for storing the rotational speed detected by the detecting means; calculating means for calculating the difference between the present rotational speed output from the detecting means and plural past rotational speeds stored in the storage means; first judging means for judging whether each of the plural differences calculated by the calculating means is larger than a first threshold value; second judging means for judging whether at least one of the plural differences calculated by the calculating means is larger than a second threshold value; third judging means for judging on the basis of the judgment results of the first judging means and the second judging means whether rotation abnormality occurs in the electric motor; and control means for controlling the electric motor in accordance with the judgment result of the third judging means, wherein the first threshold value and the second threshold value are values for detecting a deceleration trend of the rotational speed of the electric motor, the first threshold value is set to be smaller than the second threshold value, and when both the first judging means and the second judging means make positive judgments, the third judging means judges that rotation abnormality occurs in the electric motor.

Accordingly, when the rotational speed of the electric motor is temporarily decelerated by the effect of disturbance, the respective differences vary so as to approach to the first threshold value and the second threshold value while displaced from one another and then immediately separate from them, and there does not occur any case where all the differences are larger than the first threshold value and also at least one of the differences is larger than the second threshold value. Therefore, erroneous detection of rotation abnormality of the electric motor can be prevented. Furthermore, when the rotational speed of the electric motor is continued to be decelerated without the effect of disturbance, the respective differences continuously vary so as to approach to the first threshold value and the second threshold value while displaced from one another, so that all the differences are larger than the first threshold value and also at least one of the differences is larger than the second threshold value. Therefore, the rotation abnormality of the electric motor can be surely detected. Still furthermore, when all the differences are larger than the smaller first threshold value and also at least one of the differences is larger than the larger second threshold value, it is judged that rotation abnormality occurs in the electric motor. Therefore, the rotation abnormality of the electric motor can be more rapidly detected as compared with a case where occurrence of rotation abnormality is judged when all the differences exceed a threshold value as in the case of the related art.

An electric motor controller according to a third invention comprises: detecting means for detecting the rotational speed of an electric motor; storage means for storing the rotational speed detected by the detecting means; first calculating means for calculating the difference between a first past rotational speed stored in the storage means and a second past rotational speed newer than the first past rotational speed; second calculating means for calculating the difference between the first past rotational speed and a present rotational speed output from the detecting means; first judging means for judging whether the difference calculated by the first calculating means is larger than a first threshold value; second judging means for judging whether at least one of the differences calculated by the first calculating means and the second calculating means is larger than a second threshold value; third judging means for judging on the basis of the judgment results of the firsts judging means and the second judging means whether rotation abnormality occurs in the electric motor; and control means for controlling the electric motor in accordance with the judgment result of the third judging means, wherein the first threshold value and the second threshold value are values for detecting a deceleration trend of the rotational speed of the electric motor, the first threshold value is set to be smaller than the second threshold value, and when both the first judging means and the second judging means make positive judgments, the third judging means judges that rotation abnormality occurs in the electric motor.

As described above, the difference between the first past rotational speed and the second past rotational speed newer than the first past rotational speed and the difference between the first past rotational speed and the present rotational speed vary respectively in accordance with the variation of the rotational speed of the electric motor, and the difference between the past rotational speeds has a later reaction to the variation of the rotational speed than the other difference. Furthermore, the reaction of the difference between the past rotational speeds is later as the past rotational speed is older. Therefore, when the rotational speed of the electric motor is temporarily decelerated by the effect of disturbance, the respective differences vary so as to approach to the first threshold value and the second threshold value while displaced from one another and then immediately separate from them. Accordingly, there does not occur any case where the difference between the past rotational speeds is larger than the first threshold value and also at least one of the differences is larger than the second threshold value, so that erroneous detection of rotation abnormality of the electric motor can be prevented. Still furthermore, when the rotational speed of the electric motor is continuously decelerated without the effect of disturbance, the respective differences continuously vary so as to approach to the first threshold value and the second threshold value while displaced from one another, so that the differences between the past rotational speeds is larger than the first threshold value and also at least one of the differences is larger the second threshold value. Therefore, the rotation abnormality of the electric motor can be surely detected. Still furthermore, the two different threshold values are provided to detect the deceleration trend of the rotational speed of the electric motor, and occurrence of rotation abnormality in the electric motor is judged when the differences between the past rotational speeds having later reaction is larger than the smaller first threshold value and also at least one of the differences is larger than the larger second threshold value. Therefore, the rotation abnormality of the electric motor can be more rapidly detected as compared with the case where all the differences exceed a threshold value as in the case of the related art.

An electric motor controller according to a fourth invention comprises: detecting means for detecting the rotational speed of an electric motor; storage means for storing the rotational speed detected by the detecting means; first calculating means for calculating the difference between a first past rotational speed stored in the storage means and a second past rotational speed newer than the first past rotational speed; second calculating means for calculating the difference between the first past rotational speed and a present rotational speed output from the detecting means; first judging means for judging whether each of the differences calculated by the first calculating means and the second calculating means is larger than a first threshold value; second judging means for judging whether at least one of the differences calculated by the first calculating means and the second calculating means is larger than a second threshold value; third judging means for judging on the basis of the judgment results of the first judging means and the second judging means whether rotation abnormality occurs in the electric motor; and control means for controlling the electric motor in accordance with the judgment result of the third judging means, wherein the first threshold value and the second threshold value are values for detecting a deceleration trend of the rotational speed of the electric motor, the first threshold value is set to be smaller than the second threshold value, and when both the first judging means and the second judging means make positive judgments, the third judging means judges that rotation abnormality occurs in the electric motor.

Accordingly, when the rotational speed of the electric motor is temporarily decelerated by the effect of disturbance, the respective differences vary so as to approach to the first threshold value and the second threshold value while displaced from one another and then immediately separate from each other. Therefore, there does not occur any case where both the differences are larger than the first threshold value and also at least one of the differences is larger than the second threshold value, so that erroneous detection of rotation abnormality of the electric motor can be prevented. Furthermore, when the rotational speed of the electric motor is continuously decelerated without the effect of disturbance, the respective differences continuously vary so as to approach to the first threshold value and the second threshold value while displaced from each other. Therefore, both the differences are larger than the first threshold value and also at least one of the differences is larger than the second threshold value, so that rotation abnormality of the electric motor can be surely detected. Furthermore, when both the differences are larger than the smaller first threshold value and also at least one of the differences is larger than the larger second threshold value, occurrence of rotation abnormality in the electric motor is judged. Therefore, the rotation abnormality of the electric motor can be more rapidly detected as compared with the case where occurrence of rotation abnormality is judged when all the differences exceed a threshold value as in the case of the related art.

According to the present invention, the two different threshold values for detecting the deceleration trend of the rotational speed of the electric motor are provided, the differences of the plural rotational speeds are calculated, and when one or all of the differences are larger than the first threshold value and also at least one difference is larger than the second threshold value, occurrence of rotation abnormality of the electric motor is judged. Therefore, the rotation abnormality of the electric motor which is not caused by the effect of disturbance can be surely and rapidly detected with preventing erroneous detection of rotation abnormality of the electric motor which is caused by the effect of disturbance.

DESCRIPTION OF PREFERRED EMBODIMENTS

Figure 1:
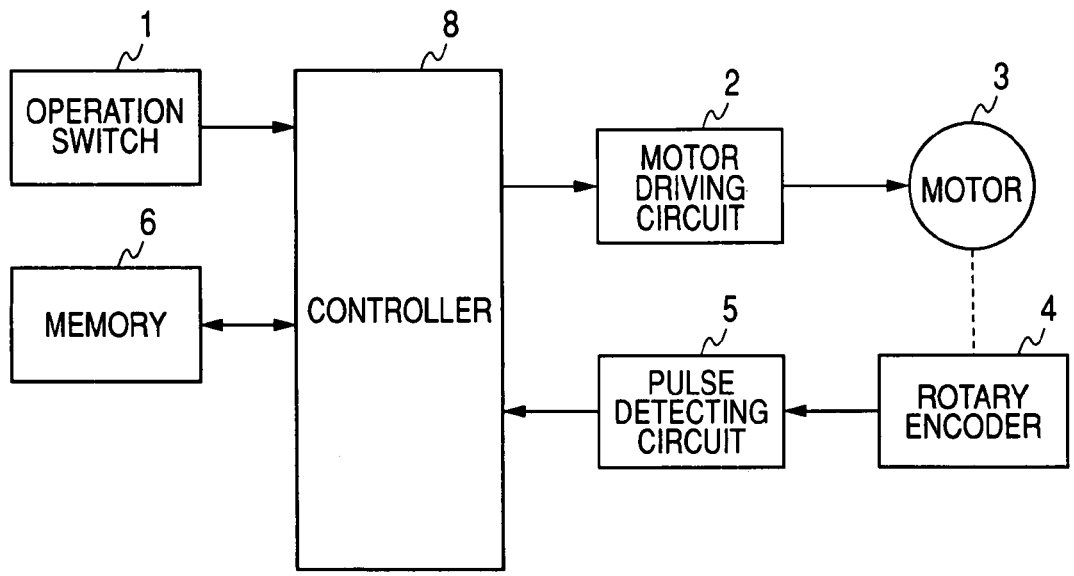
FIG. 1 is a block diagram showing the electrical construction of a power window device according to an embodiment of the present invention.
Figure 2:
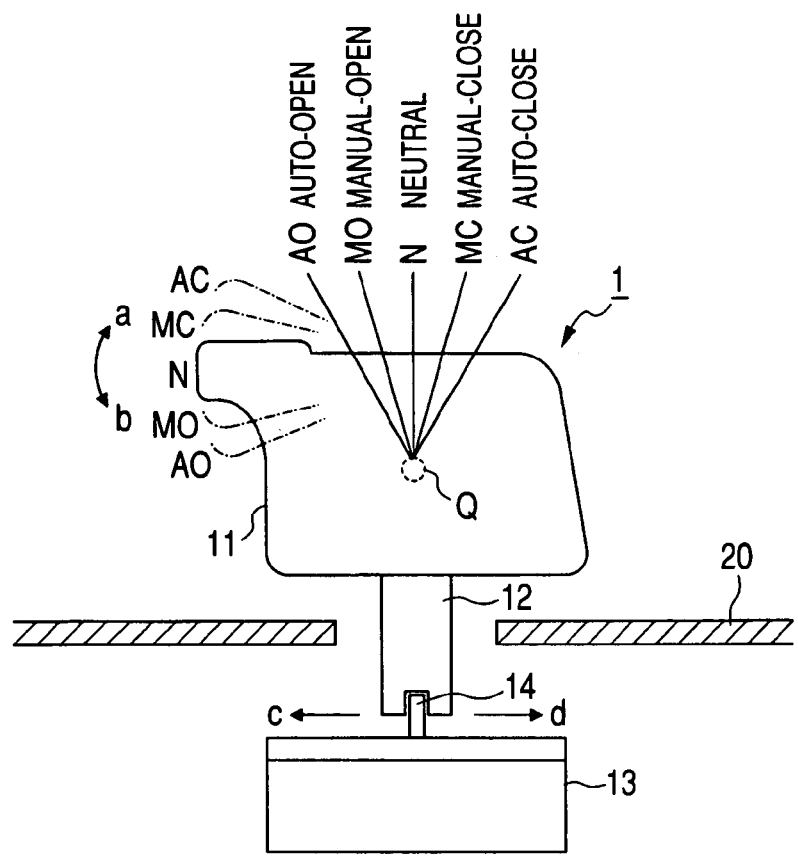
FIG. 2 is a diagram showing the construction of an embodiment of an operation switch.
Figure 3:
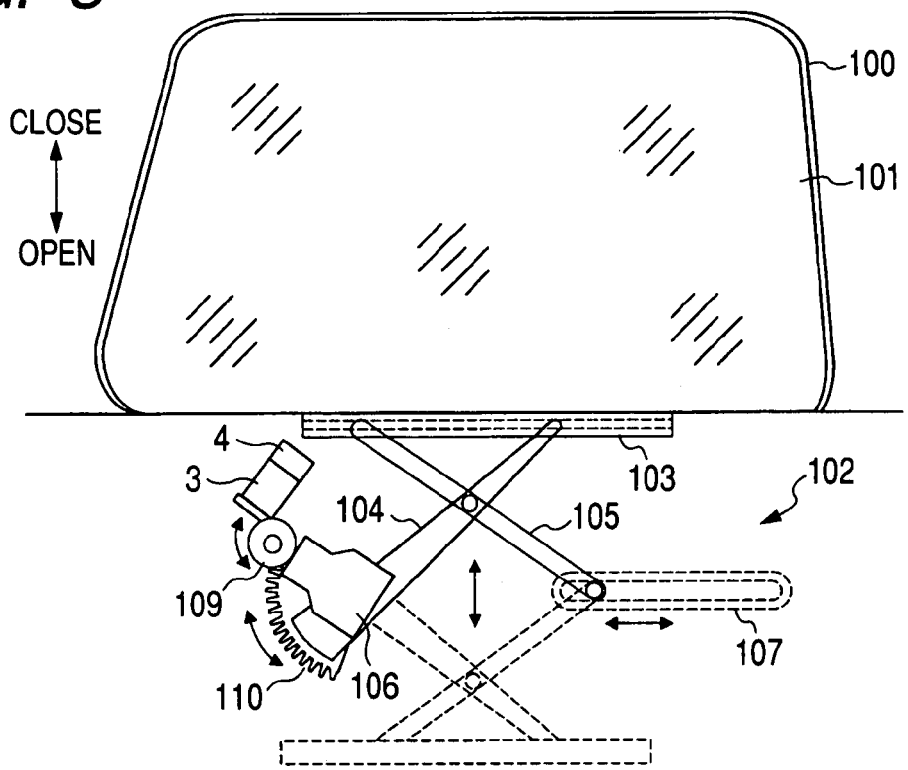
FIG. 3 is a diagram showing an example of a window opening/closing mechanism.
Figure 4:
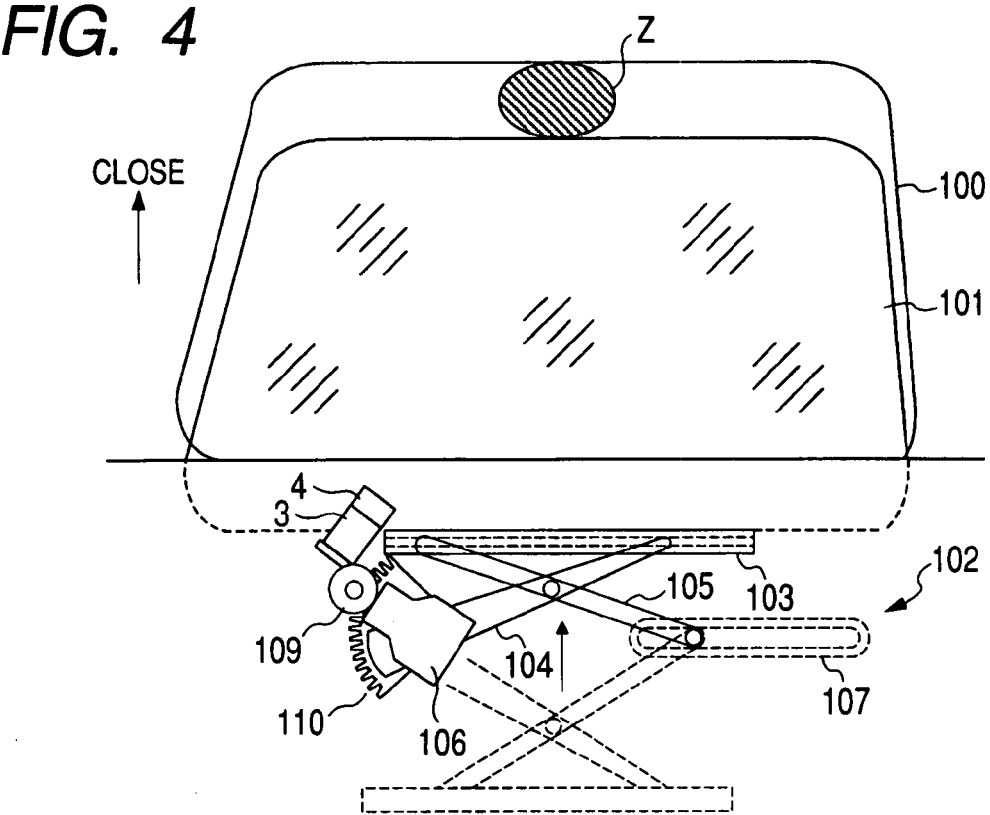
FIG. 4 is a diagram showing a state where an object is stuck in a window.

Embodiments of the present invention will be described hereunder with reference to the drawings. In the following description, FIGS. 1 to 4 described in "Background Art" are cited as embodiments of the present invention. FIG. 1 is a block diagram showing the electrical construction of a power window device according to an embodiment of the present invention. The power window device is an opening/closing controller for controlling the opening/closing operation of a window of a vehicle, and it constitutes an embodiment of an electric motor controller of the present invention. A motor 3 constitutes an embodiment of the electric motor of the present invention. A controller 8 constitutes an embodiment of control means of the present invention. FIG. 2 is a schematic diagram showing the construction of an embodiment of an operation switch. FIG. 3 is a diagram showing an example of a window opening/closing mechanism provided to each window of the vehicle. FIG. 4 is a diagram showing a state where an object is stuck in the window in FIG. 3. These figures have been already described, and thus the duplicative description is omitted.

Figure 5:
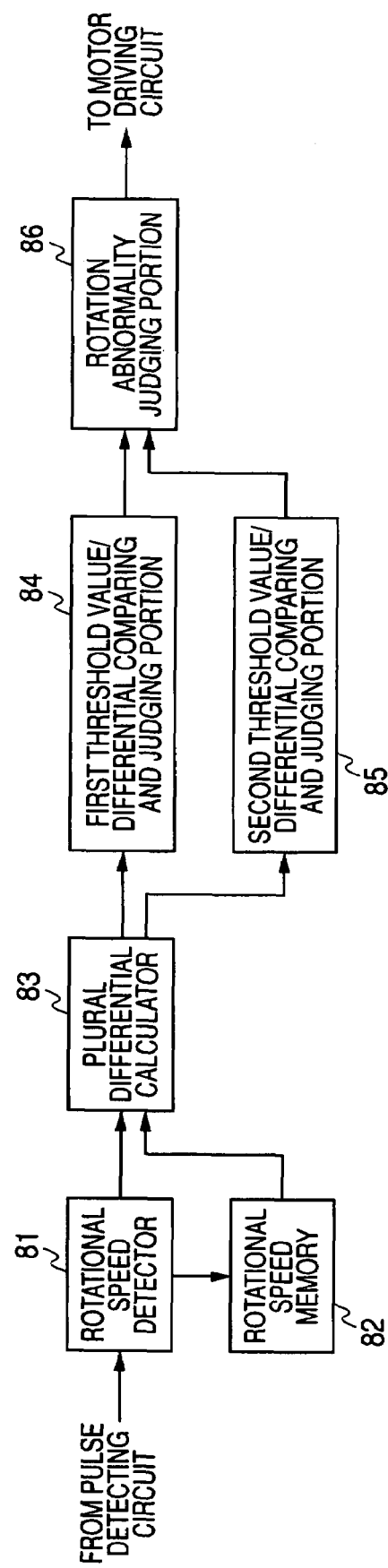
FIG. 5 is a diagram showing rotation abnormality detecting blocks according to a first embodiment of the present invention.

FIG. 5 is a diagram showing rotation abnormality detecting blocks of a first embodiment of the present invention. The rotation abnormality detecting blocks are equipped to the controller 8. In this case, it is illustrated as a hardware circuit for convenience, however, the function of each circuit is actually implemented by software. Of course, the rotation abnormality detecting blocks may be constructed by a hardware circuit. The same is applied to the other embodiments.

In FIG. 5, the rotational speed detector 81 counts the number of pulses output from the pulse detecting circuit 5 of FIG. 1 to detect the rotational speed of the motor 3 at a predetermined period. A rotational speed memory 82 successively stores the rotational speed detected by the rotational speed detector 81. A plural difference calculator 83 calculates the difference between the present rotational speed output from the rotational speed detector 81 and each of plural past rotational speeds stored in the rotational speed memory 82. A first threshold/difference comparing and judging portion 84 compares each difference calculated in the plural difference calculator 83 with a first threshold value, and judges whether the difference concerned is larger than the first threshold value. A second threshold value/difference comparing and judging portion 85 compares each difference calculated in the plural difference calculating portion 83 with a second threshold value and judges whether the difference concerned is larger than the second threshold value. The first threshold value and the second threshold value will be described later. On the basis of the judgment results of the first threshold value/difference comparing and judging portion 84 and the second threshold value/difference comparing and judging portion 85, the rotation abnormality judging portion 86 judges whether rotation abnormality of the motor 3 occurs because an object Z is stuck in the window 100 as shown in FIG. 4, and outputs a control signal corresponding to the judgment result to the motor driving circuit 2 of FIG. 1.

The rotational speed detector 81 constitutes an embodiment of the detecting means of the present invention. The rotational speed memory 82 constitutes an embodiment of the storage means of the present invention. The plural difference calculator 83 constitutes an embodiment of the calculating means of the present invention. The first threshold value/difference comparing and judging portion 84 constitutes an embodiment of the first judging means of the present invention. The second threshold value/difference comparing and judging portion 85 constitutes an embodiment of the second judging means. The rotation abnormality judging portion 86 constitutes an embodiment of the third judging means of the present invention.

Figure 6:
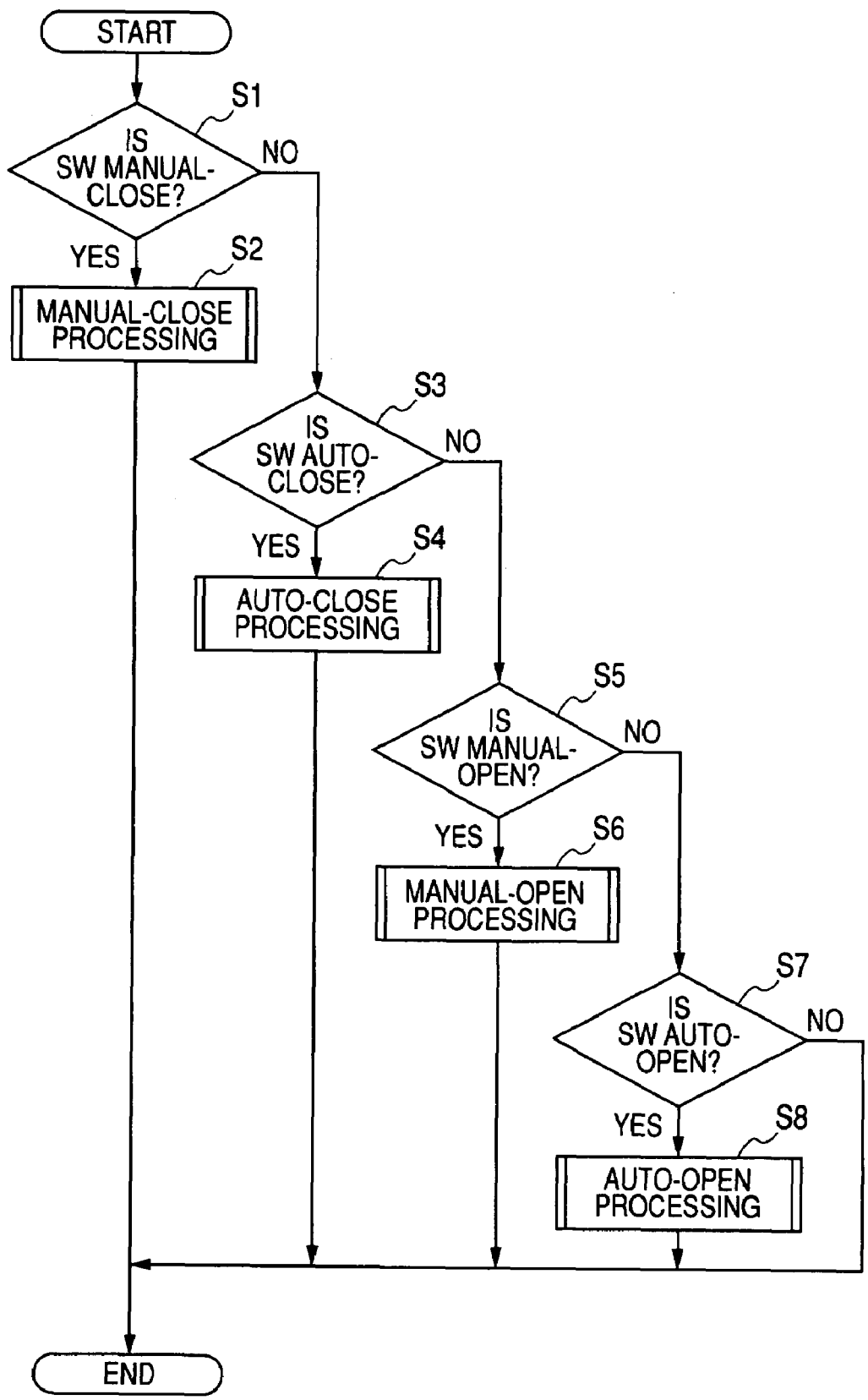
FIG. 6 is a flowchart showing the basic operation of a power window device.

FIG. 6 is a flowchart showing the basic operation of the power window device. If the operation switch 1 of FIG. 2 is set to the manual-close MC position in step S1, the processing of the manual-close operation is carried out (step S2). If the operation switch 1 is set to the auto-close AC position in step S3, the processing of the auto-close operation is carried out (step S4). If the operation switch 1 is set to the manual-open MO position in step S5, the processing of the manual-open operation is carried out (step S6). If the operation switch 1 is set to the auto-open AO position in step S7, the processing of the auto-open operation is carried out (step S8). Furthermore, if the operation switch 1 is not set to the auto-open AO position in step S7, the operation switch 1 is set to the neutral N position, and no processing is carried out. The details of the steps S2, S4, S6, S8 will be described step by step.

Figure 7:
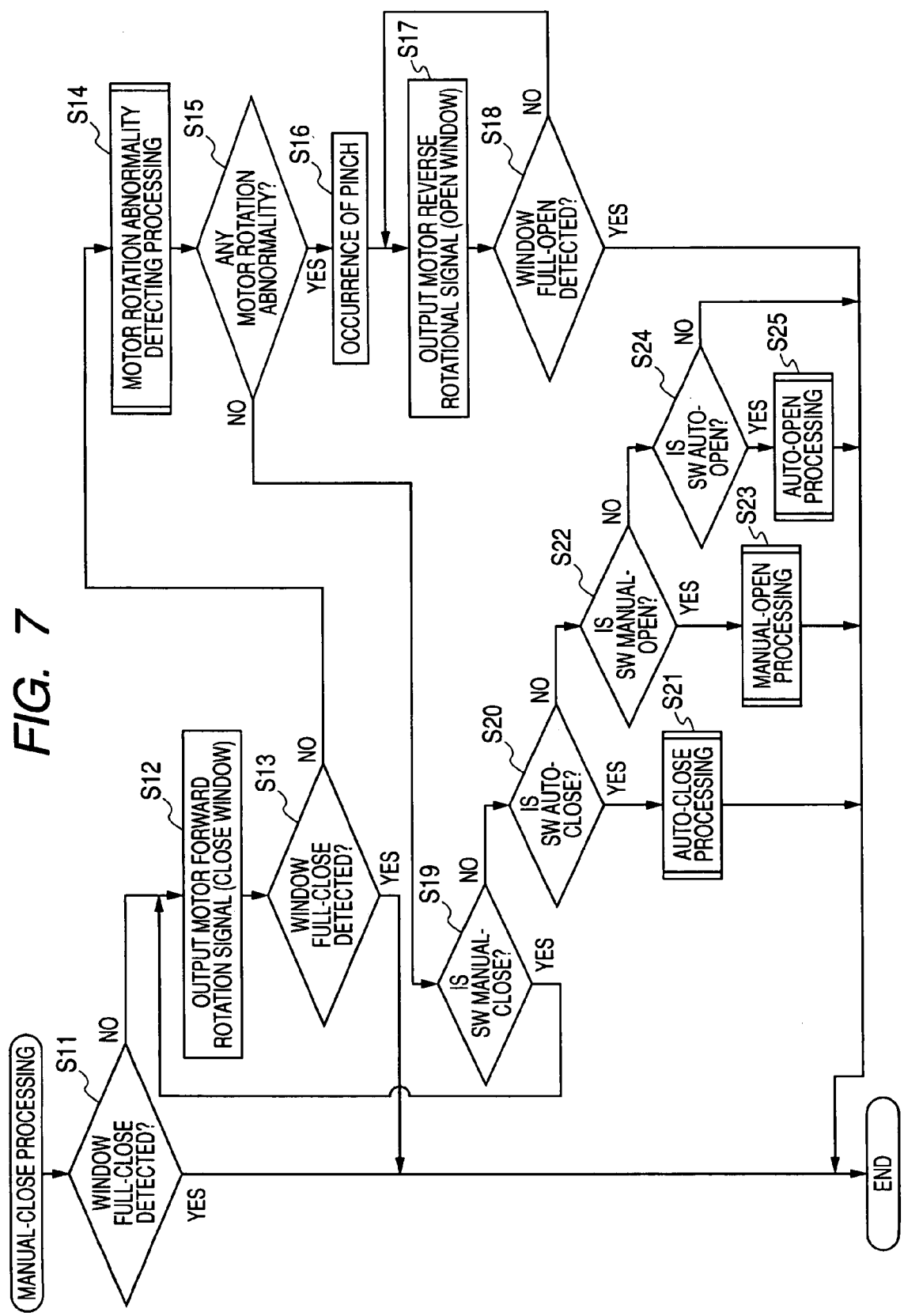
FIG. 7 is a flowchart showing the detailed procedure of manual-close processing.

FIG. 7 is a flowchart showing the detailed procedure of the manual-close operation in the step S2 of FIG. 6, and step S58 of FIG. 9 and step S65 of FIG. 10 which will be described later. Each step is executed by CPU constituting the controller 8. The same is applied to the flowcharts described later. First, it is judged on the output of the rotary encoder 4 whether the window 100 is completely closed by the manual-close operation (step S11). If the window 100 is completely closed (step S11: YES), the processing is finished. If the window 100 is not completely closed (step S11: NO), a forward rotation signal is output from the motor driving circuit 2 to rotate the motor 3 forwardly, and the window 100 is closed (step S12). Subsequently, it is judged whether the window 100 is completely closed (step S13). If the window 100 is completely closed (step S13: YES), the processing is finished. On the other hand, if the window 100 is not completely closed (step S13: NO), the rotation abnormality detecting processing of the motor 3 is executed (step S14). The details of this processing will be described later.

If a result of the processing of step S14 indicates occurrence of rotation abnormality of the motor 3 (step S15: YES), it is judged that an object Z is stuck in the window 100 as shown in FIG. 4 (step S16). Then, a reverse rotation signal is output from the motor driving circuit 2 to rotate the motor 3 reversely and open the window 100 (step S17), whereby the sticking is released. Then, it is judged whether the window 100 is completely opened (step S18). If the window 100 is completely opened (step S18: YES), the processing is finished. If the window 100 is not completely opened (step S18: NO), the processing returns to the step S17 to continue the reverse rotation of the motor 3.

If a result of the processing of step S14 indicates no occurrence of rotation abnormality of the motor 3 (step S15: NO), the object Z is not stuck in the window 100, and thus it is judged whether the operation switch 1 is set to the manual-close MC position in step S19. If the operation switch 1 is set to the manual-close MC position (step S19: YES), the processing returns to step S12 to continue the forward rotation of the motor 3. On the other hand, if the operation switch 1 is not set to the manual-close MC position (step S19: NO), it is judged whether the operation switch 1 is set to the auto-close AC position (step S20). If the operation switch 1 is set to the auto-close AC position (step S20: YES), the processing is shifted to auto-close processing described later (step S21) If the operation switch 1 is not set to the auto-close AC position (step S20: NO), it is judged whether the operation switch 1 is set to the manual-open MO position (step S22). If the operation switch 1 is set to the manual-open MO position, (step S22: YES), the processing shifts to the manual-open processing described later (step S23). On the other hand, if the operation switch 1 is not set to the manual-open MO position (step S22: NO), it is judged whether the operation switch 1 is set to the auto-open AO position (step S24). If the operation switch 1 is set to the auto-open AO position (step S24: YES), the processing is shifted to the auto-open processing described later (step S25), and if the operation switch 1 is not set to the auto-open AO position (step S24: NO), no action is taken and the processing is finished.

Figure 8:
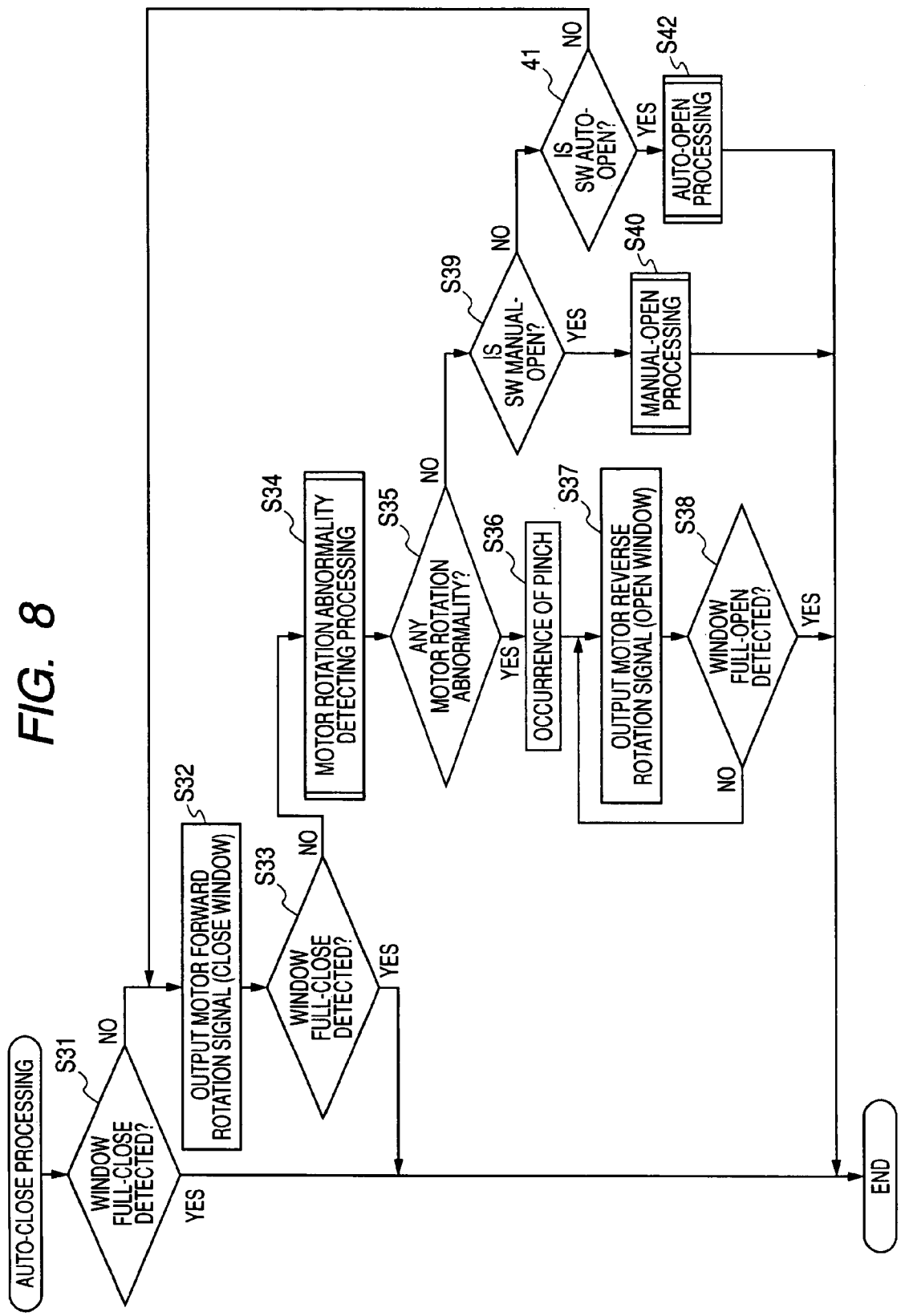
FIG. 8 is a flowchart showing the detailed procedure of auto-close processing.
Figure 9:
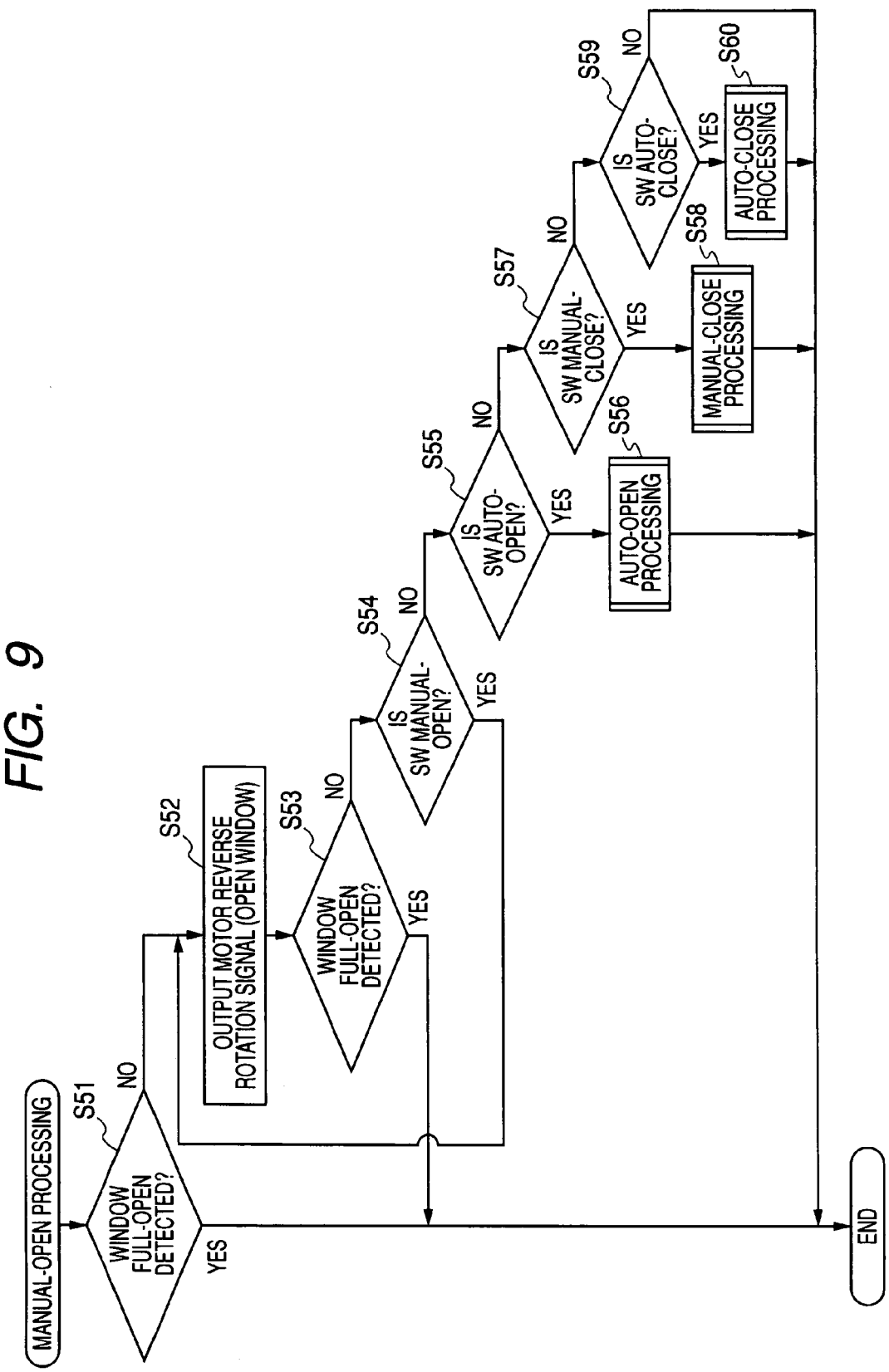
FIG. 9 is a flowchart showing the detailed procedure of manual-open processing.
Figure 10:
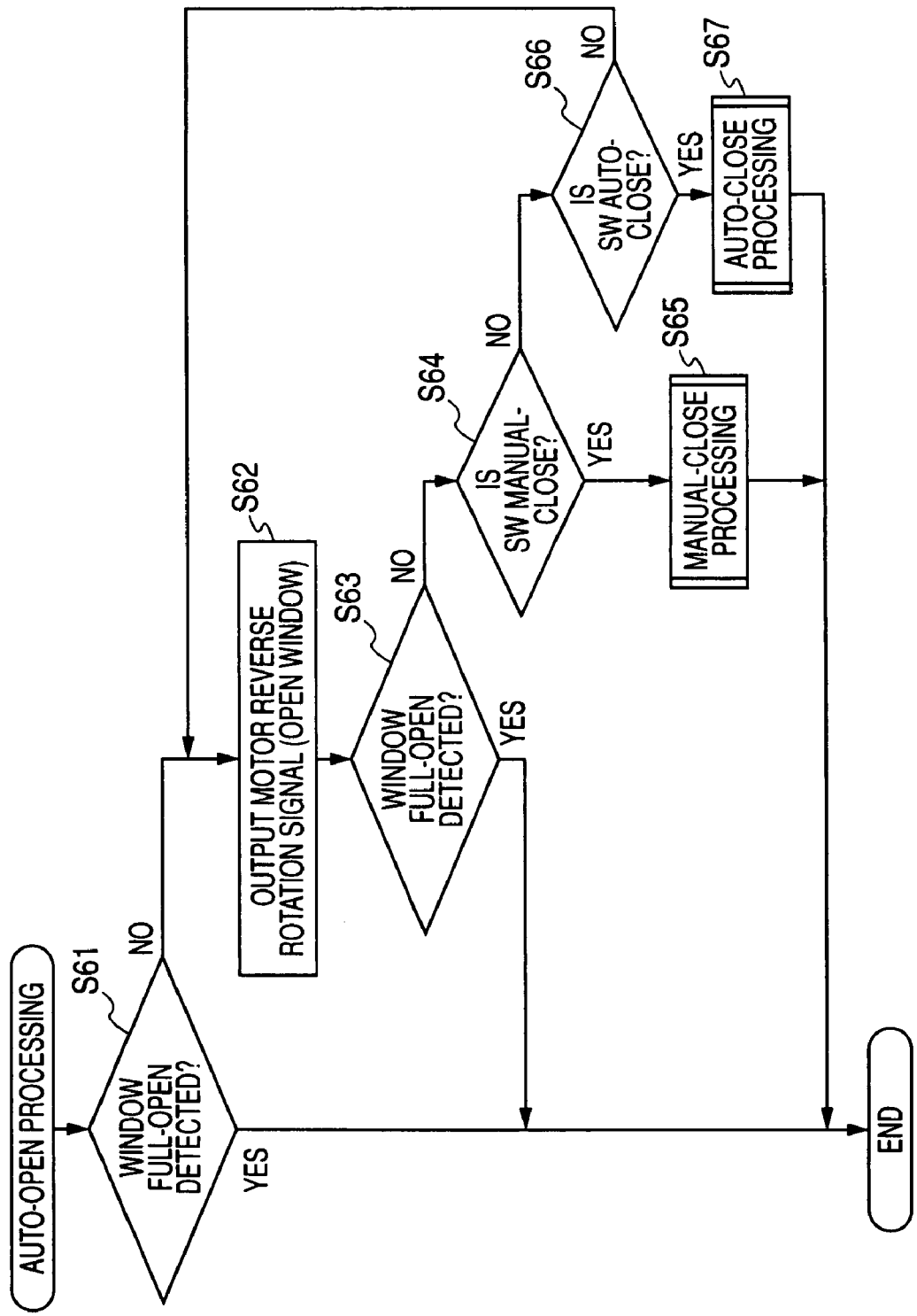
FIG. 10 is a flowchart showing the detailed procedure of auto-open processing.

FIG. 8 is a flowchart showing the detailed procedure of the auto-close operation in the step S4 of FIG. 6, the step S21 of FIG. 7 and a step S60 of FIG. 9 and a step S67 of FIG. 10. First, it is judged on the basis of the output of the rotary encoder 4 whether the window 100 is completely closed or not through the auto-close operation (step S31). If the window 100 is completely closed (step S31: YES), the processing is finished. If the window 100 is not completely closed (step S31: NO), the forward rotation signal is output to the motor driving circuit 2 to rotate the motor 3 forwardly and close the window 100 (step S32). Subsequently, it is judged whether the window 100 is completely closed (step S33), and if the window 100 is completely closed (step S33: YES), the processing is finished. On the other hand, if the window 100 is not completely closed (step S33: NO), the processing of detecting rotation abnormality of the motor 3 is executed (step S34). The details of this processing will be also described later.

If a result of the processing of step S34 indicates occurrence of rotation abnormality of the motor 3 (step S35: YES), it is judged that the object Z is stuck in the window 100 (step S36). Then, the reverse rotation signal is output from the motor driving circuit 2 to rotate the motor 3 reversely, and the window 100 is opened (step S37), whereby the sticking is released. Then, it is judged whether the window 100 is completely opened (step S38). If the window 100 is completely opened (step S38: YES), the processing is finished. If the window 100 is not completely opened (step S38: NO), the processing returns to step S37 to continue the reverse rotation of the motor 3.

On the other hand, if a result of the processing of the step S34 indicates no occurrence of rotation abnormality of the motor 3 (step S35: NO), the object Z is not stuck in the window 100, and thus it is judged in step S39 whether the operation switch 1 is set to the manual-open MO position. If the operation switch 1 is set to the manual-open MO position (step S39: YES), the processing shifts to the manual-open processing described later (step S40). If the operation switch 1 is not set to the manual-open MO position (step S39: NO), it is judged whether the operation switch 1 is set to the auto-open AO position (step S41). If the operation switch 1 is set to the auto-open AO position (step S41: YES), the processing shifts to the auto-open processing described later (step S42). If the operation switch 1 is not set to the auto-open AO position (step S41: NO), the processing returns to step S32 to continue the forward rotation of the motor 3.

FIG. 9 is a flowchart showing the detailed procedure of the manual-open processing in the step S6 of FIG. 6, the step S23 of FIG. 7 and a step S40 of FIG. 8. FIG. 9 is not the feature of the present invention, however, a series of steps of FIG. 9 will be described. First, it is judged on the output of the rotary encoder 4 whether the window 100 is completely opened through the manual-open operation (step S51). If the window 100 is completely opened (step S51: YES), the processing is finished. If the window 100 is not completely opened (step S51: NO), the reverse rotation signal is output from the motor driving circuit 2 to rotate the motor 3 reversely and open the window 100 (step S52). Subsequently, it is judged whether the window 100 is completely opened (step S53). If the window 100 is completely opened (step S53: YES), the processing is finished. If the window 100 is not completely opened (step S53: NO), it is judged whether the operation switch 1 is set to the manual-open MO position (step S54). If the operation switch 1 is set to the manual-open MO position (step S54: YES), the processing returns to step S52 to continue the reverse rotation of the motor 3. If the operation switch 1 is not set to the manual-open MO position (step S54: NO), it is judged whether the operation switch 1 is set to the auto-open AO position (step S55). If the operation switch 1 is set to the auto-open AO position (step S55: YES), the processing shifts to the auto-open processing described later (step S56). If the operation switch 1 is not set to the auto-open AO position (step S55: NO), it is judged whether the operation switch 1 is set to the manual-close MC position (step S57). If the operation switch 1 is set to the manual-close MC position (step S57: YES), the processing shifts to the manual-close processing described above (step S58). If the operation switch 1 is not set to the manual-close MC position (step S57: NO), it is judged whether the operation switch 1 is set to the auto-close AC position (step S59). If the operation switch 1 is set to the auto-close AC position (step S59: YES), the processing shifts to the auto-close processing described above (step S60). If the operation switch 1 is not set to the auto-close position AC (step S59: NO), no action is taken and the processing is finished.

FIG. 10 is a flowchart showing the detailed procedure of the auto-open processing in the step S8 of FIG. 6, the step S25 of FIG. 7, the step S42 of FIG. 8 and the step S56 of FIG. 9. This figure is not the feature of the present invention, however, a series of steps thereof will be described. First, it is judged on the basis of the output of the rotary encoder 4 whether the window 100 is completely opened through the auto-open operation (step S61). If the window 100 is completely opened (step S61: YES), the processing is finished. If the window 100 is not completely opened (step S61: NO), the reverse rotation signal is output from the motor driving circuit 2 to rotate the motor 3 reversely and open the window 100 (step S62). Subsequently, it is judged whether the window 100 is completely opened or not (step S63). If the window 100 is completely opened (step S63: YES), the processing is finished. If the window 100 is not completely opened (step S63: NO), it is judged whether the operation switch 1 is set to the manual-close MC position (step S64). If the operation switch 1 is set to the manual-close MC position (step S64: YES), the processing shifts to the manual-close processing described above (step S65). If the operation switch 1 is not set to the manual-close MC position (step S64: NO), it is judged whether the operation switch 1 is set to the auto-close AC position (step S66). If the operation switch 1 is set to the auto-close AC position (step S66: YES), the processing shifts to the auto-close processing described above (step S67). If the operation switch 1 is not set to the auto-close AC position (step S66: NO), the processing returns to the step S62 to continue the reverse rotation of the motor 3.

Figure 11:
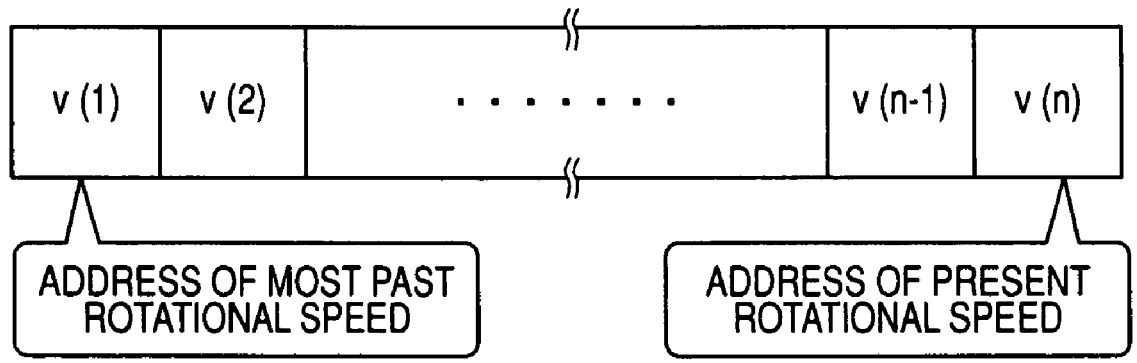
FIG. 11 is a diagram showing a part of a storage area for storing rotational speeds of a motor.

FIG. 11 is a diagram showing a storage area (register) that is provided to the controller 8 to store the rotational speed of the motor 3. The most past rotational speed v(1) is stored at the first address from the left side, and the present rotational speed v(n) is stored at the first address from the right side. Past rotational addresses v(2), . . . , v(n−1) that are newer than the most past rotational speed v(1) and older than the present rotational speed v(n) are stored at plural addresses between the above two addresses so that the past rotational speeds are gradually newer from the left to the right. The content of each address, that is, the stored data of the rotational speed v(1), . . . , v(n) is renewed every time the rotational speed of the motor 3 is detected by the rotational speed detector 81 of FIG. 5. The initial values of the rotational speeds v(1), . . . , v(n) are set to "0".

Figure 12:
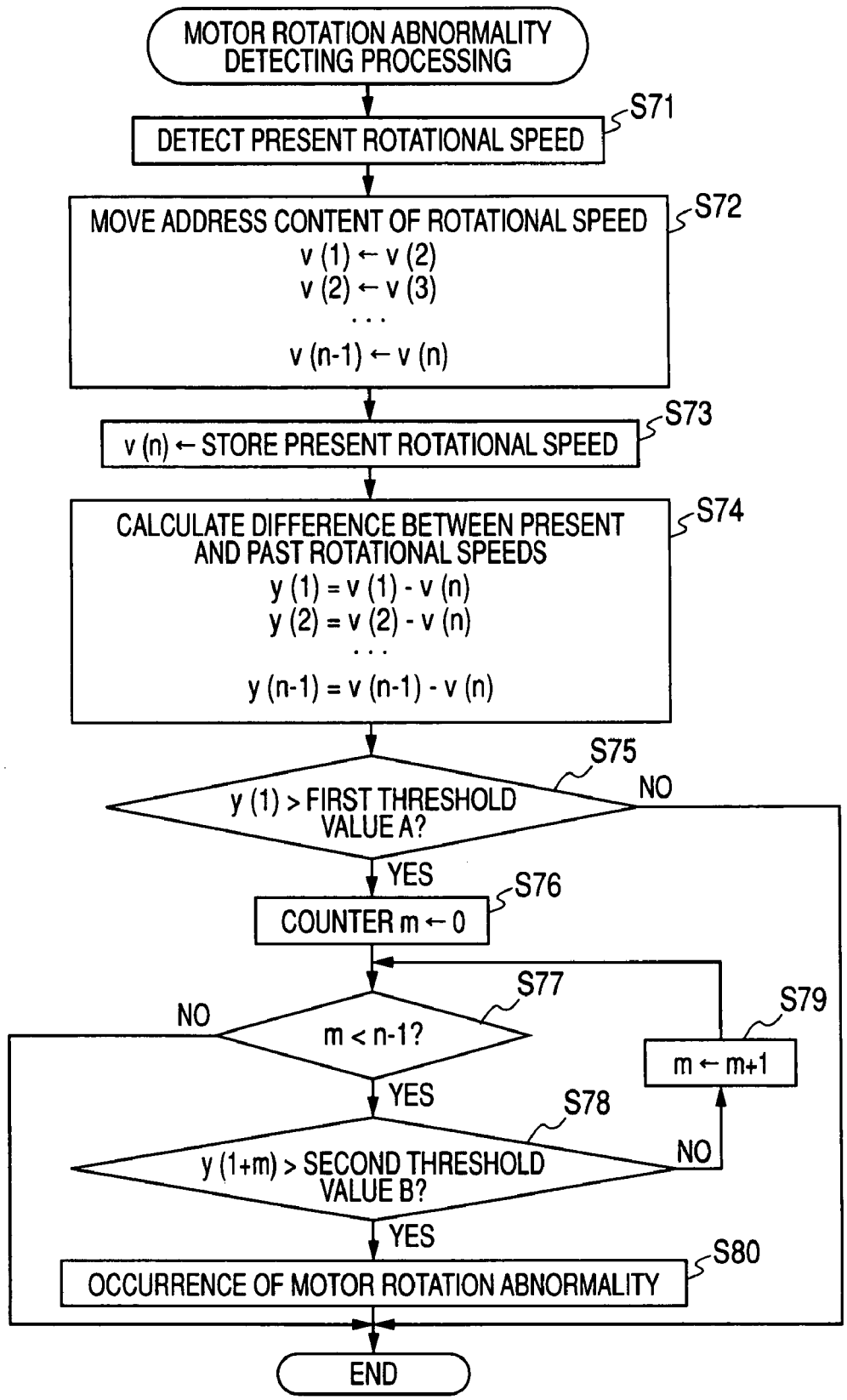
FIG. 12 is a flowchart showing the detailed procedure of rotation abnormality detecting processing of the motor according to the first embodiment of the present invention.

FIG. 12 is a flowchart showing the detailed procedure of the processing of detecting the rotation abnormality of the motor 3 in the step S14 of FIG. 7 and the step S34 of FIG. 8. In FIG. 12, the present rotational speed of the motor 3 is first detected by the rotational speed detector 81 of FIG. 5 (step S71), and stored in the rotational speed memory 82. Subsequently, the contents of the addresses for the rotational speeds in the storage area of the controller 8 are successively moved so that they are displaced to the past side one by one (step S72). That is, the data stored at the respective addresses are successively shifted to the adjacent left addresses like the data stored at the address of v(2) of FIG. 1 is moved to the address of v(1). The present rotational speed is read out from the rotational speed memory 82, and stored at the address of v(n) of FIG. 11 (step S73 of FIG. 12). Subsequently, in the plural difference calculator 83 of FIG. 5, the content of each address of FIG. 11 is read, and the difference y(1), . . . , y(n−1) between the present rotational speed v(n) and each of plural past rotational speeds v(1), . . . , v(n−1) is calculated (step S74). At this time, the present rotational speed V(n) is subtracted from each past rotational speed v(1), . . . , v(n−1) (y(1)=v(1)−v(n), . . . , y(n−1)=v(n−1)−v(n)). The number of the differences y(1), . . . , y(n−1) may be plural, however, it is more preferable three or more.

Figure 13:
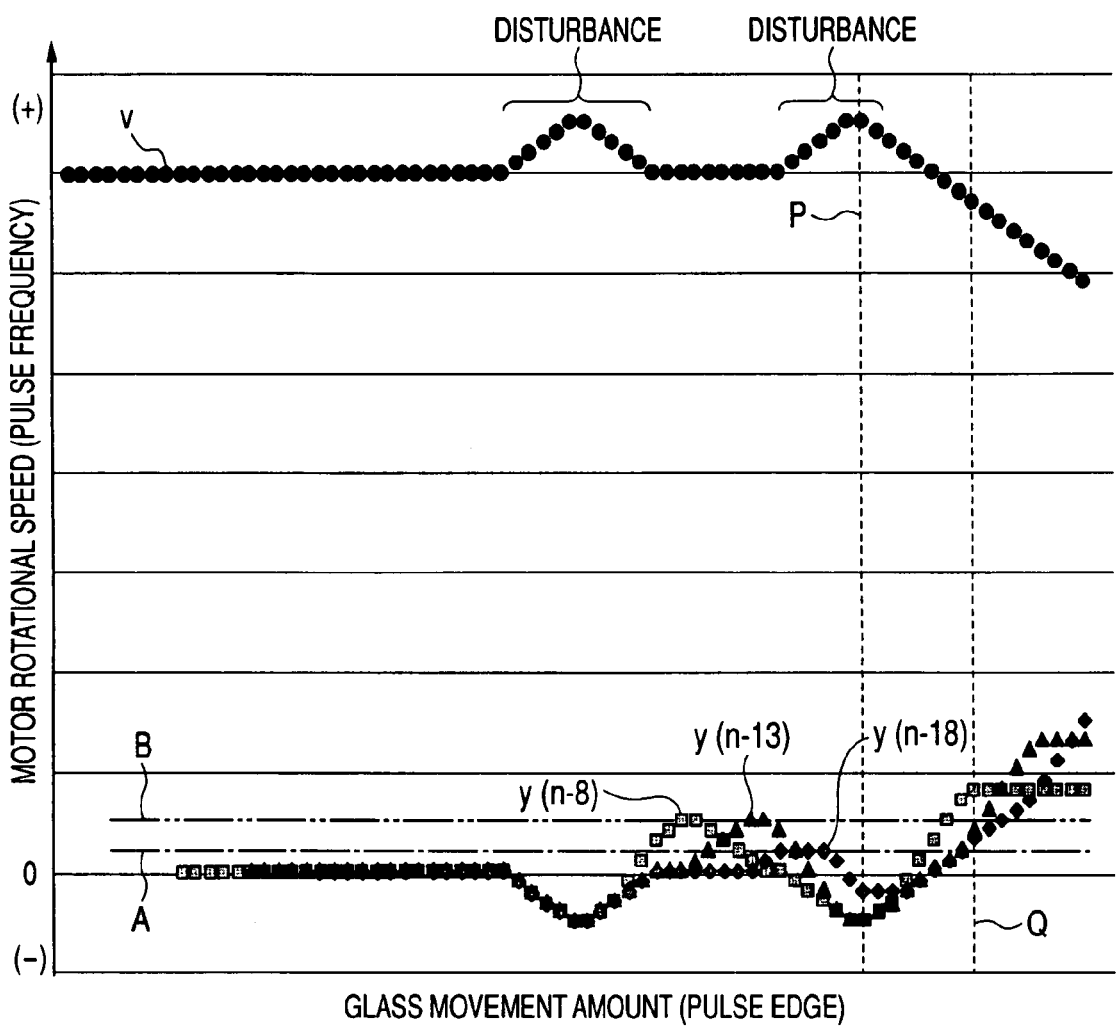
FIG. 13 is a diagram showing variation states of the rotation speed of the motor and the difference of rotational speeds according to the first embodiment of the present invention.

FIG. 13 is a diagram showing the variation state of the rotational speed of the motor 3 and the difference of the rotational speeds during the closing operation of the window 100 according to the first embodiment. The ordinate axis represents the motor rotational speed, that is, the frequency of pulses output from the rotary encoder 4 of FIG. 1. The abscissa axis represents the movement amount of the window glass 101, that is, the timing of the edges of the pulses. v indicated by filled round marks at the upper side represents the live rotational speed of the motor 3 which is detected by the rotational speed detector 81 and stored in the rotational speed memory 82. y(n−8) indicated by filled square marks at the lower side, y(n−13) indicated by filled triangular marks and y(n−18) indicated by filled rhomboidal marks represent examples of the differences y calculated by the plural difference calculator 83. Specifically, y(n−8) represents the difference between the present rotational speed v(n) and the past rotational speed v(n−8) eight times before the present rotational speed. y(n−13) represents the difference between the present rotational speed v(n) and the past rotational speed v(n−13) thirteen times before the present rotational speed. y(n−18) represents the difference between the present rotational speed v(n) and the past rotational speed y(n−18) eighteen times before the present rotational speed. The differences y(n−8), y(n−13), y(n−18) are achieved by subtracting the present rotational speed v(n) from the past rotational speeds v(n−8), v(n−13), v(n−18) respectively. The calculation is carried out as described above because the increase/decrease trend of each difference y(n−8), y(n−13), y(n−18) with respect to the rotational speed v is set to the same and the variation state of the rotational speed v is made easily comprehensible. Accordingly, during the time period when the rotational speed v is a uniform velocity, all the differences y(n−8), y(n−13), y(n−18) indicate "0". When the rotational speed v is accelerated (increased), all the differences y(n−8), y(n−13), y(n−18) are increased (shifted to "−" side), and when the rotational speed v is decelerated (reduced), all the differences y(n−8), y(n−13), y(n−18) are reduced (shifted to "+" side). Therefore, the acceleration/deceleration trend of the rotational speed v can be detected by detecting the increasing/decreasing trend of the differences y(n−8), y(n−13), y(n−18).

A indicated by a one-dotted chain line and B indicated by a two-dotted chain line at the lower side represent a first threshold value and a second threshold value to be compared with the differences y(y−8), y(n−13), y(n−18). The first threshold value A and the second threshold value B are set so that they are larger than "0" (values at the "+" side) and the first threshold value A is smaller than the second threshold value B (0<A<B), and also they are stored in a predetermined area of the memory 6 in advance. The reason why the above setting is carried out resides in that the weak or strong decreasing trend of the differences y(n−8), y(n−13), y(n−18) is detected from the comparison result of the threshold values A, B and the differences y(n−8), y(n−13), y(n−18), thereby detecting the weak or strong deceleration trend of the rotational speed v. In this embodiment, the first threshold value A is set to 2 Hz, and the second threshold value B is set to 5 Hz.

FIG. 13 shows a state where an impact occurs and thus it is input as disturbance during the closing operation of the window 100 because the vehicle runs on a bad road, a door is drastically closed or the like, and then the object Z is stuck in the window 100 as shown in FIG. 4. The same is applied to FIGS. 15, 18 and 21 described later. Since the disturbance is input during the closing operation of the window 100, the rotational speed v of the motor 3 is pulsated so as to be accelerated (increased) and then decelerated (reduced) as shown at the center of FIG. 13. Furthermore, in accordance with the variation of the rotational speed v, the differences y(n−8), y(n−13), y(n−18) vary so as to increase from "0" to "−" side, decrease to "+" side while being displaced from one another, and then immediately increase to the "−" side. Thereafter, since the object Z is stuck in the window 100 at a point P indicated by a broken line, the rotational speed v of the motor 3 is continuously decelerated. Furthermore, in accordance with the variation of the rotational speed v, the differences y(n−8), y(n−13), y(n−18) are continued to be reduced to the "+" side while displaced form one another.

After the step S74 of FIG. 12 is finished, it is judged in the first threshold value/difference comparing and judging portion 84 of FIG. 5 whether the difference y(1) between the present rotational speed v(n) and the most past rotational speed v(1) is larger than a first threshold value A (step S75). When the rotational speed v of a motor 3 is a uniform velocity or the rotational speed v is pulsated by the effect of disturbance as indicated at the left side from the P point of FIG. 13, the difference y(n−18) corresponding to the difference y(1) between the present rotational speed v(n) and the most past rotational speed v(1) in FIG. 13 is equal to or less than the first threshold value A. Accordingly, it is judged in step S75 of FIG. 12 that the difference y(1) is not larger than the first threshold value A (step S75: NO). The difference y(1) does not have the weak decrease trend, the rotational speed v does not have the deceleration trend and no rotation abnormality occurs in the motor 3. Therefore, the rotation abnormality detecting processing is finished, and the processing shifts to the step S15 of FIG. 7 or the step S35 of FIG. 8. Thereafter, no rotation abnormality of the motor 3 occurs (step S15: NO or step S35: NO), and thus it is judged whether the operation switch 1 is set to the manual-close MC position or not (step S19 or step S39). If the operation switch 1 is not set to the manual-close MC position (step S19: NO or step S39: NO), the processing of S20 to S25 is executed as described above. Furthermore, if the operation switch 1 is set to the manual-close MC position (step S19: YES or step S39: YES), the forward rotation of the motor 3 is continued (step S12 or step S32). If the window 100 has not yet been completely closed (step S13: NO or step S33: NO), the rotation abnormality detecting processing of the motor 3 is executed (step S14 or step S34).

Thereafter, when the object Z is stuck in the window 100 at the P point of FIG. 13 and thus the rotational speed v of the motor 3 continues to decelerate, the difference y(n−18) becomes larger than the first threshold value A as indicated by Q point. In this case, it is judged in step S75 of FIG. 12 that the difference y(1) is larger than the first threshold value A (step S75: YES), and it is found that the difference y(1) has at least a weak decrease trend. Subsequently, "0" is input to the counter m provided to the controller 8 in order to compare the differences y(1), . . . , y(n−1) with the second threshold value B in the detecting order of the past rotational speeds v(1), . . . , v(n−1) used to calculate the differences y(1), . . . , y(n−1). Subsequently, it is judged whether the counter m is smaller than the number [n−1] of the differences y(1), . . . , y(n−1) (step S77). For example, the counter m is set to "0" at the initial stage, and there are plural differences y(1) . . . y(n−1). Therefore, it is judged that the counter m is smaller than [n−1] (step S77: YES). Then, it is judged in the second threshold value/difference comparing and judging portion 85 whether the difference y(1+m) is larger than the second threshold value B (step S78). For example, since the counter m is set to "0" at the initial stage, the difference y(1) is compared with the second threshold value B. Here, if it is judged that the difference y(1+m) is not larger than the second threshold value B (step S78: NO), the difference y(1+m) does not have the strong decrease trend, and thus [m+1] is input to the counter m (step S79). Then, the processing shifts to step S77 to judge whether the counter m is smaller than the number [n−1].

If the difference y(n−8) becomes larger than the second threshold value B as indicated by the Q point of FIG. 13, it is judged in step S78 of FIG. 12 that the difference y(1+m) is larger than the second threshold value B (step S78: YES). Accordingly, the difference y(1+m) has a strong decrease trend and the present rotational speed v has a strong deceleration trend, so that it is judged in the rotation abnormality judging portion 86 of FIG. 5 that rotation abnormality of the motor 3 occurs (step S80). The rotation abnormality detecting processing is finished, and the processing shifts to the step S15 of FIG. 7 and the step S35 of FIG. 8 Thereafter, since rotation abnormality of the motor 3 occurs (step S15: YES or step S35: YES), it is judged that the object Z is stuck in the window 100 (step S16 or step S36). Then, the motor 3 is reversely rotated to open the window 100 (step S17 or step S37), and the subsequent processing is executed as described above.

The number of past differences y(1+m) which are judgment targets in step S78 of FIG. 12 may be set to a fixed value. For example, the difference from the past rotational speed eighteen times before at maximum may be calculated as the difference as a judgment target of the step S78. Very old past differences may be deleted from the memory 6 periodically. Accordingly, the use amount of the memory 6 can be reduced. Furthermore, a judgment based on old past differences can be avoided. That is, disturbance occurring due to very old past differences can be avoided.

In the step S78 of FIG. 12, the difference y(1+m) is not larger than the second threshold value B (step S78: NO). After the step S79, if the counter m is equal to [n−1] or more in step S77 (step S77: NO), the comparison of all the differences y(1), . . . , y(n−1) with the second threshold value B is finished without detecting occurrence of any rotation abnormality of the motor 3, so that the rotation abnormality detecting processing is finished and then the processing shifts to the step S15 of FIG. 7 or the step S35 of FIG. 8. Thereafter, since no rotation abnormality of the motor 3 occurs (step S15: NO or step S35: NO), it is judged whether the operation switch 1 is set to the manual-close MC position (step S19 or the step S39), and the subsequent processing is executed as described above.

According to the first embodiment, the difference y(1), . . . , y(n−1) between the present rotational speed v(n) and each of the plural past rotational speeds v(1), . . . , v(n−1) varies in accordance with the variation of the rotational speed v of the motor 3, and the reaction of the difference y(1), . . . , y(n−1) to the variation of the rotational speed v is later as the past rotational speed v(1), . . . , v(n−1) is older. That is, the reaction of the difference y(1) between the present rotational speed v(n) and the most past rotational speed v(1) is latest. Therefore, when the rotational speed v of the motor 3 is temporarily decelerated by the effect of disturbance, the respective differences y(1), . . . , y(n−1) vary so as to approach to the first threshold value A and the second threshold value B while displaced from one another and then immediately separate from them, so that there is no case where the difference y(1) is larger than the first threshold value A and also at least one of the differences y(1), . . . , y(n−1) is larger than the second threshold value B. Therefore, erroneous detection of rotation abnormality of the motor 3 can be prevented.

Furthermore, when the rotational speed of the motor 3 is continuously decelerated because the object Z is stuck in the window 100, the respective differences y(1), . . . , y(n−1) continuously vary so as to approach to the first threshold value A and the second threshold value B while displaced from one another, so that the difference y(1) is larger than the first threshold value A and also at least one of the differences y(1), . . . , y(n−1) is larger than the second threshold value B. Therefore, rotation abnormality of the motor 3 can be surely detected.

Furthermore, the two different threshold values A, B are provided to detect the deceleration trend of the rotational speed v of the motor 3, and occurrence of rotation abnormality of the motor 3 is judged when the difference y(1) between the present rotational speed v(n) having late reaction and the most past rotational speed v(1) is larger than the smaller first threshold value A and also at least one of the differences y(1), . . . , y(n−1) is larger than the larger second threshold value B. Therefore, the judgment frequency is smaller and thus the rotation abnormality of the motor 3 can be more rapidly detected as compared with the case where occurrence of rotation abnormality is judged when all the differences exceed a threshold value as in the case of the related art. Particularly, with respect to only the difference y(1), it is judged whether the difference y(1) is larger than the first threshold value A. With respect to the other differences y(2), . . . , y(n−1), it is not judged whether they are larger than the first threshold value A. Therefore, the rotation abnormality of the motor 3 can be further rapidly detected.

Figure 14:
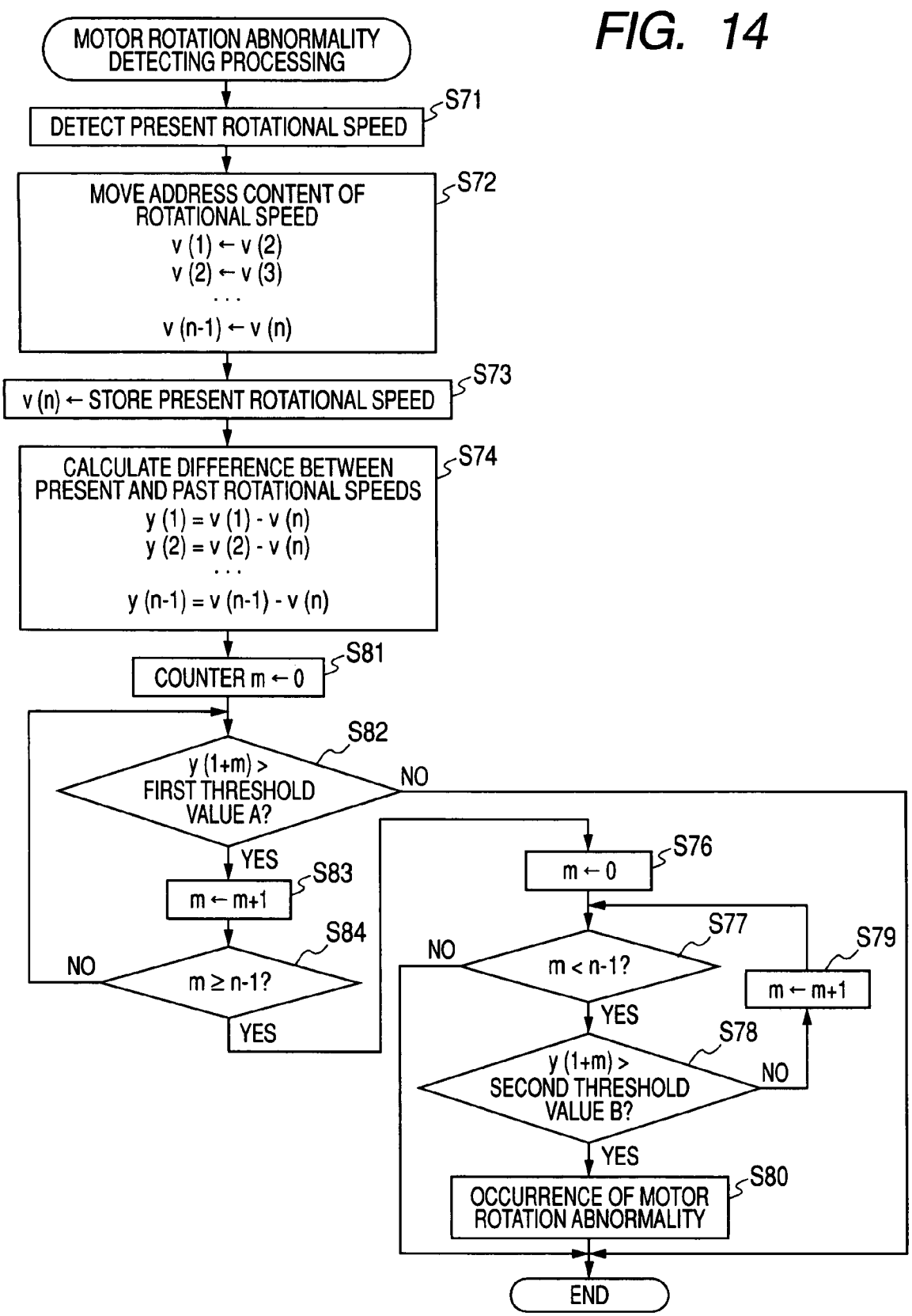
FIG. 14 is a flowchart showing the detailed procedure of the rotation abnormality detecting processing of the motor according to a second embodiment of the present invention.

FIG. 14 is a flowchart showing the detailed procedure of a part of the rotation abnormality detecting processing of the motor 3 according to a second embodiment of the present invention. In FIG. 14, the same processing as FIG. 12 is represented by the same reference numerals. The rotation abnormality detecting blocks, the closing operation of the window 100 and the storage state of the rotational speed of the motor 3 according to the second embodiment are the same as FIG. 5, FIG. 7, FIG. 8 and FIG. 11, and thus these figures are cited as the second embodiment.

Figure 15:
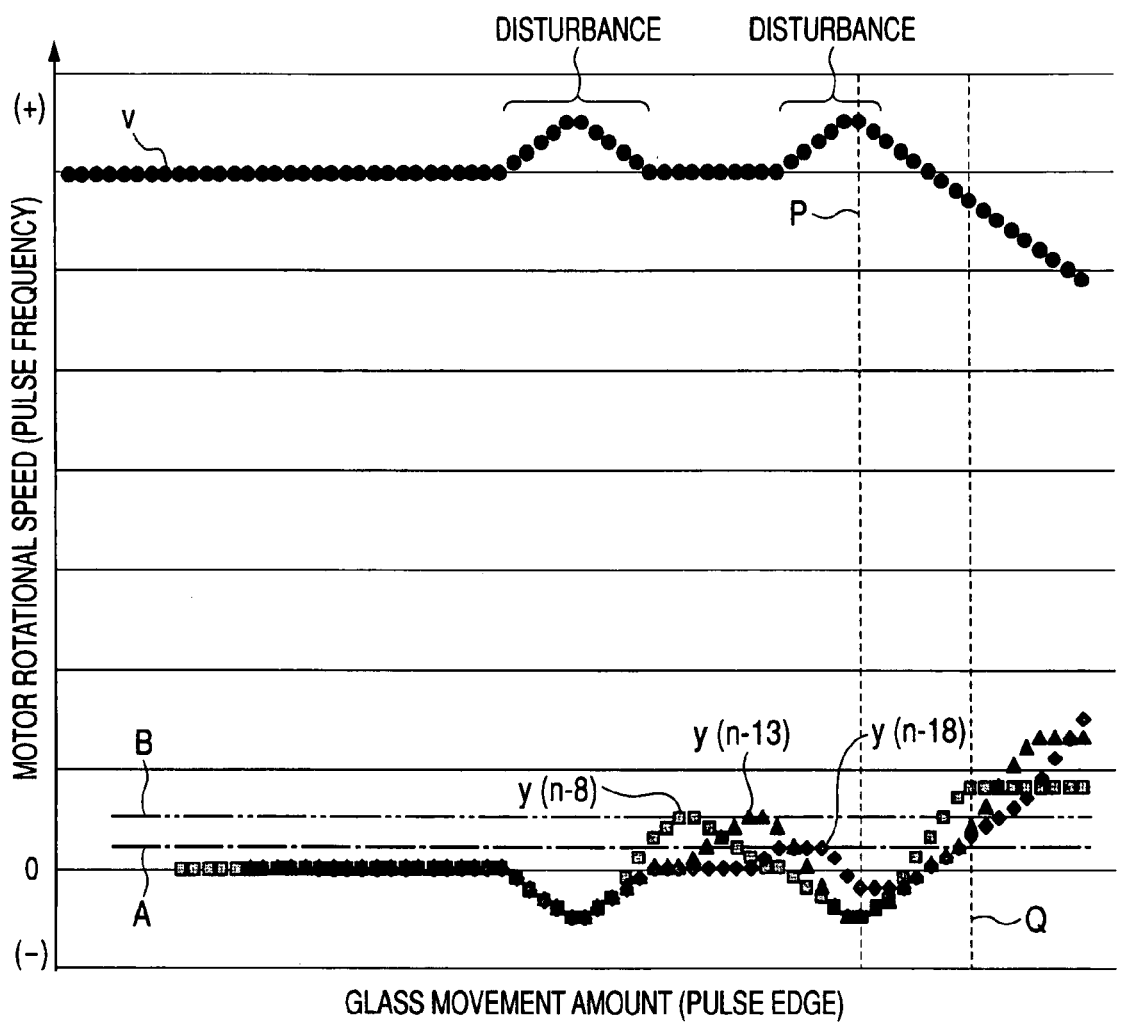
FIG. 15 is a diagram showing the variation states of the rotational speed of the motor and the difference of rotational speeds according to the second embodiment of the present invention.

In FIG. 14, after the steps S71 to S73 described above are executed, the differences y(1), . . . , y(n−1) between the present rotational speed v(n) and the past rotational speeds v(1), . . . , v(n−1) are calculated in step S74. FIG. 15 shows the variation states of the rotational speed of the motor 3 and the differences of the rotational speeds during the closing operation of the window 100 according to the second embodiment. The display style, detection method and variation state of the rotational speed v of the motor 3 are the same as FIG. 13. The displayed differences y(v−8), y(n−13), y(n−18), and the display style, calculation method and variation states of these differences are the same as FIG. 13. The display style of the threshold values A, B and the set values thereof are the same as FIG. 13.

After the step S74 of FIG. 14 is finished, the differences y(1), . . . , y(n−1) are compared with the first threshold value A in the detection order of the past rotational speed v(1), . . . , v(n−1) used to calculate the differences y(1), . . . , y(n−1), and thus "0" is input to the counter m (step S81). Subsequently, it is judged in the first threshold value/difference comparing and judging portion 84 whether the difference y(1+m) is larger than the first threshold value A (step S82). For example, at the initial stage, the counter m is equal to "0", and thus the difference y(1) is compared with the first threshold value A. Here, if it is judged that the difference y(1+m) is larger than the first threshold value A (step S82: YES), [m+1] is input to the counter m (step S83). Then, it is judged whether the counter m is equal to or larger than the number [n−1] of the differences y(1), . . . , y(n−1) (step S84). For example, at the initial stage, the counter m is equal to "1" and the number of the differences y(1), . . . , y(n−1) is plural, and thus it is judged that the counter m is not equal to [n−1] or more (step S84: NO). In this case, the processing shifts to the step S82 to judge whether the next difference y(1+m) is larger than the first threshold value A.

When the rotational speed v of the motor 3 is a uniform velocity as indicated at the left side from the center of FIG. 15, all the differences y(n−18), y(n−13), y(n−8) are equal to the first threshold value A or less. Furthermore, when the rotational speed v of the motor 3 is pulsated by the effect of disturbance as indicated at the center of FIG. 15, the differences y(n−8), y(n−13) are larger than the first threshold value A, however, the difference y(n−18) is not larger than the first threshold value A. In these cases, it is judged in the step S82 of FIG. 14 that the difference y(1+m) is not larger than the first threshold value A (step S82: NO). The difference y(1+m) does not have a weak decrease trend, the rotational speed v does not have a deceleration trend, and no rotation abnormality of the motor 3 occurs. Therefore, the rotation abnormality detecting processing is finished, and the processing shifts to the step S15 of FIG. 7 or the step S35 of FIG. 8. Thereafter, since no rotation abnormality occurs in the motor 3 (step S15: NO or step S35: NO), it is judged whether the operation switch 1 is set to the manual-close MC position or not (step S19 or step S39), and the subsequent processing is executed as described above.

Thereafter, when the object Z is stuck in the window 100 at the P point of FIG. 15 and thus the rotational speed v of the motor 3 is continued to be decelerated, all the differences y(n−18), y(n−13), y(n−8) become larger than the first threshold value A as indicated at the Q point. In this case, the difference y(1+m) is judged to be larger than the first threshold value A in step S82 of FIG. 14 (step S82: YES). Furthermore, after the step S83, it is continued to be judged that the difference y(1+m) is larger than the first threshold value A in step S82 (step S82: YES) during the time when the counter m is less than [n−1] in step S84 (step S84: NO). Then, if the counter m is equal to [n−1] or more in step S84 (step S84: YES), it is found that all the differences y(1), . . . , y(n−1) are larger than the first threshold value A, and have at least weak decrease trend.

Subsequently, "0" is input to the counter m in order to successively the differences y(1), . . . , y(n−1) with the second threshold value B (step S76). Then, if the counter m is smaller than [n−1] (step S77: YES), it is judged whether the difference y(1+m) is larger than the second threshold value B (step S78). Here, if the difference y(1+m) is not larger than the second threshold value B (step S78: NO), [m+1] is input to the counter m (step S79), and the processing shifts to the step S77.

When the difference y(n−8) is larger than the second threshold value B as indicated at the Q point of FIG. 15, it is judged in step S78 of FIG. 14 that the difference y(1+m) is larger than the second threshold value B (step S78: YES). Since the difference y(1+m) has a strong decrease trend and the present rotational speed v has a strong deceleration trend, occurrence of rotation abnormality of the motor 3 is judged (step S80), the rotation abnormality detecting processing is finished, and the processing shifts to the step S15 of FIG. 7 and the step S35 of FIG. 8. Thereafter, rotation abnormality of the motor 3 occurs (step S15: YES or step S35: YES), and thus it is judged that the object Z is stuck in the window 100 (step S16 or step S36). The motor 3 is reversely rotated, the window 100 is opened (step S17 or step S37), and the subsequent processing is executed.

According to the second embodiment described above, when the rotational speed v of the motor 3 is temporarily decelerated by the effect of disturbance, the respective differences y(1), . . . , y(n−1) vary so as to approach to the first threshold value A and the second threshold value B while displaced from one another and then immediately separate from them, so that there occurs no case where all the differences y(1), . . . , y(n−1) are larger than the first threshold value A and also at least one of the differences y(1), . . . , y(n−1) is larger than the second threshold value B. Therefore, erroneous detection of the rotation abnormality of the motor 3 can be prevented.

When the rotational speed of the motor 3 is continuously decelerated because the object Z is stuck in the window 100, the respective differences y(1), . . . , y(n−1) continuously vary so as to approach to the first threshold value A and the second threshold value B while displaced from one another, so that all the differences y(1), . . . , y(n−1) are larger than the first threshold value A and at least one of the differences y(1), . . . , y(n−1) is larger than the second threshold value B. Therefore, the rotation abnormality of the motor 3 can be surely detected. Particularly, with respect to all the differences y(1), . . . , y(n−1), it is judged whether each difference is larger than the first threshold value A. Therefore, it can be also surely detected that the rotational speed v of the motor 3 has at least a weak deceleration trend, and the rotation abnormality of the motor 3 can be further surely detected.

Furthermore, it is judged that rotation abnormality of the motor 3 occurs when all the differences y(1), . . . , y(n−1) are larger than the smaller first threshold value A and at least one of the differences y(1), . . . , y(n−1) is larger than the second threshold value B. Accordingly, the rotation abnormality of the motor 3 can be more rapidly detected as compared with the case where it is judged that rotation abnormality occurs when all the differences exceed a threshold value as in the case of the related art.

Figure 16:
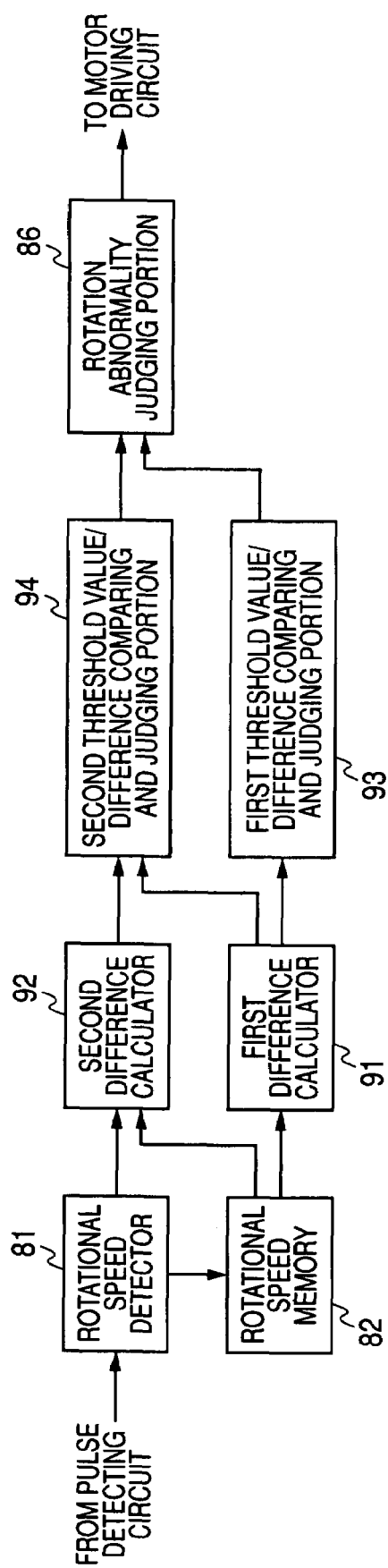
FIG. 16 is a diagram showing rotation abnormality detecting blocks according to a third embodiment of the present invention.

FIG. 16 is a diagram showing rotation abnormality detecting blocks according to a third embodiment of the present invention. In FIG. 16, the same portions as or the corresponding portions to those of FIG. 5 are represented by the same reference numerals. In the third embodiment, a first difference calculator 91 and a second difference calculator 92 are provided in place of the plural difference calculator 83 shown in FIG. 5. Furthermore, a first threshold value/difference comparing and judging portion 93 and a second threshold value/difference comparing and judging portion 94 are provided in place of the first threshold value/difference comparing and judging portion 84 and the second threshold value/difference comparing and judging portion 85 shown in FIG. 5. The first difference calculator 91 calculates the difference between a first past rotational speed stored in the rotational speed memory 82 and a second past rotational speed which is newer than the first past rotational speed. The second difference calculator 92 calculates the difference between the first past rotational speed and the present rotational speed output from the rotational speed detector 81. The first threshold value/difference comparing and judging portion 93 judges whether the difference calculated by the first difference calculator 91 is larger than the first threshold value. The second threshold value/difference comparing and judging portion 94 judges whether at least one of the differences calculated by the first difference calculator 91 and the second difference calculator 92 is larger than the second threshold value. On the basis of the judgment results of the first threshold value/difference comparing and judging portion 93 and the second threshold value/difference comparing and judging portion 94, the rotation abnormality judging portion 86 judges whether rotation abnormality of the motor 3 occurs due to the sticking of the object Z in the window 100. The first difference calculator 91 constitutes an embodiment of first calculating means of the present invention. The second difference calculator 92 constitutes an embodiment of second calculating means of the present invention. The first threshold value/difference comparing and judging portion 93 constitutes an embodiment of first judging means of the present invention. The second threshold value/difference comparing and judging portion 94 constitutes an embodiment of second judging means of the present invention.

Figure 17:
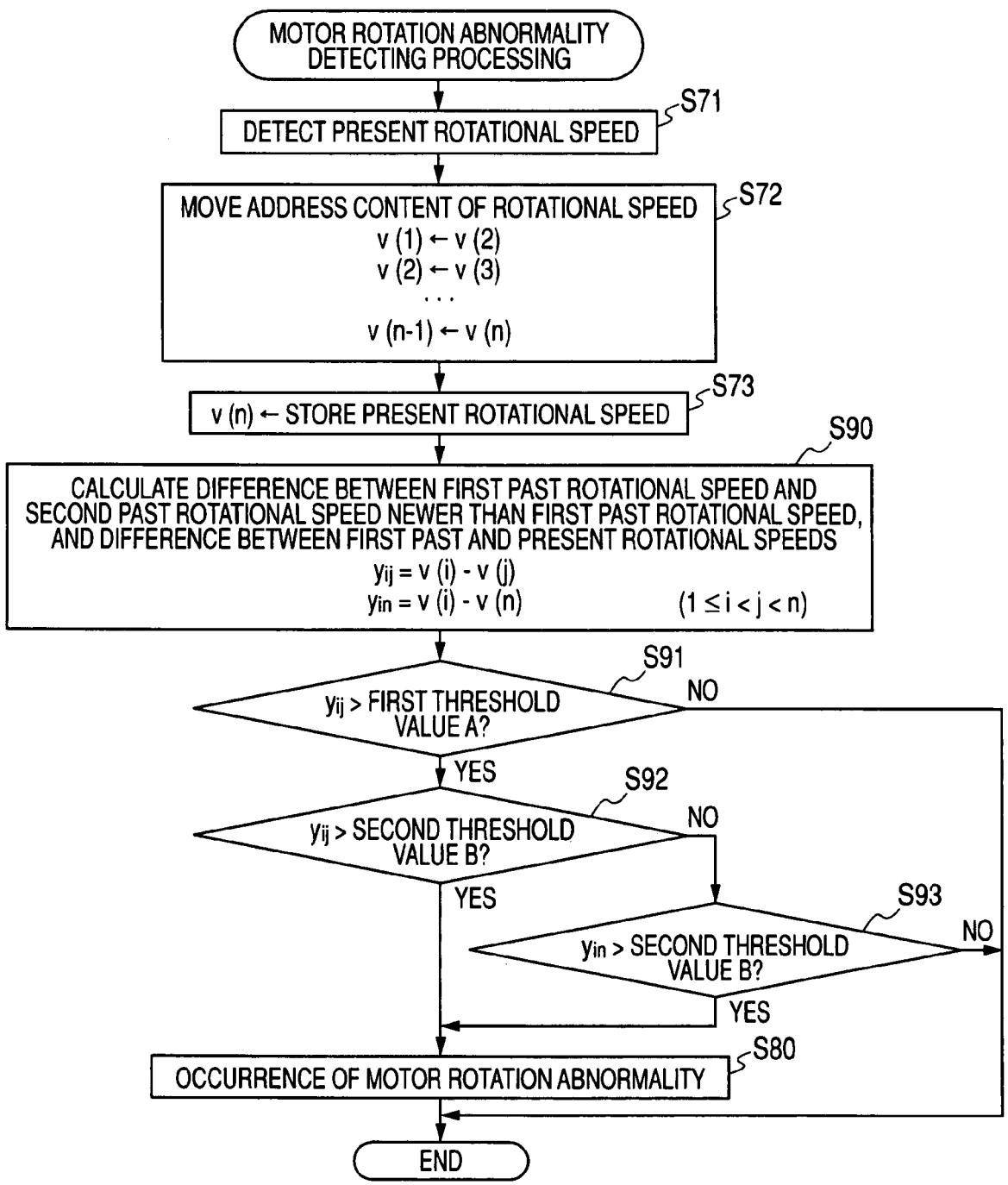
FIG. 17 is a flowchart showing the detailed procedure of the rotation abnormality detecting processing of the motor according to the third embodiment of the present invention.

FIG. 17 is a flowchart showing the detailed procedure of a part of the rotation abnormality detecting processing of the motor 3 according to the third embodiment. In FIG. 17, the same steps as FIG. 12 are represented by the same reference numerals. The closing operation of the window 100 and the storage state of the rotational speed of the motor 3 according to the third embodiment are the same as those of FIGS. 7, 8 and 11, and thus they are cited as the third embodiment.

In FIG. 17, the steps S71 to S73 are executed as described above to store the rotational speeds v(1) to v(n) in the storage area of the controller 8 as shown in FIG. 11. Subsequently, out of the rotational speeds v(1) to v(n), the first past rotational speed v(i), a second past rotational speed v(j) newer than the first past rotational speed v(i) and the present rotational speed v(n) are respectively read out from the storage area of the controller 8 (1≦i<j<n), the difference yij between the first past rotational speed v(i) and the second past rotational speed v(j) is calculated in the first difference calculator 91 of FIG. 16, and the difference yin between the first past rotational speed v (i) and the present rotational speed v(n) is calculated in the second difference calculator 92 (step S90 of FIG. 17). At this time, the second past rotational speed v(j) is subtracted from the first past rotational speed v(i) to calculate the difference yij (yij=v(i)−v(j)), and the present rotational speed v(n) is subtracted from the first past rotational speed v(i) to calculate the difference yin (yin=v(i)−v(n)).

Figure 18:
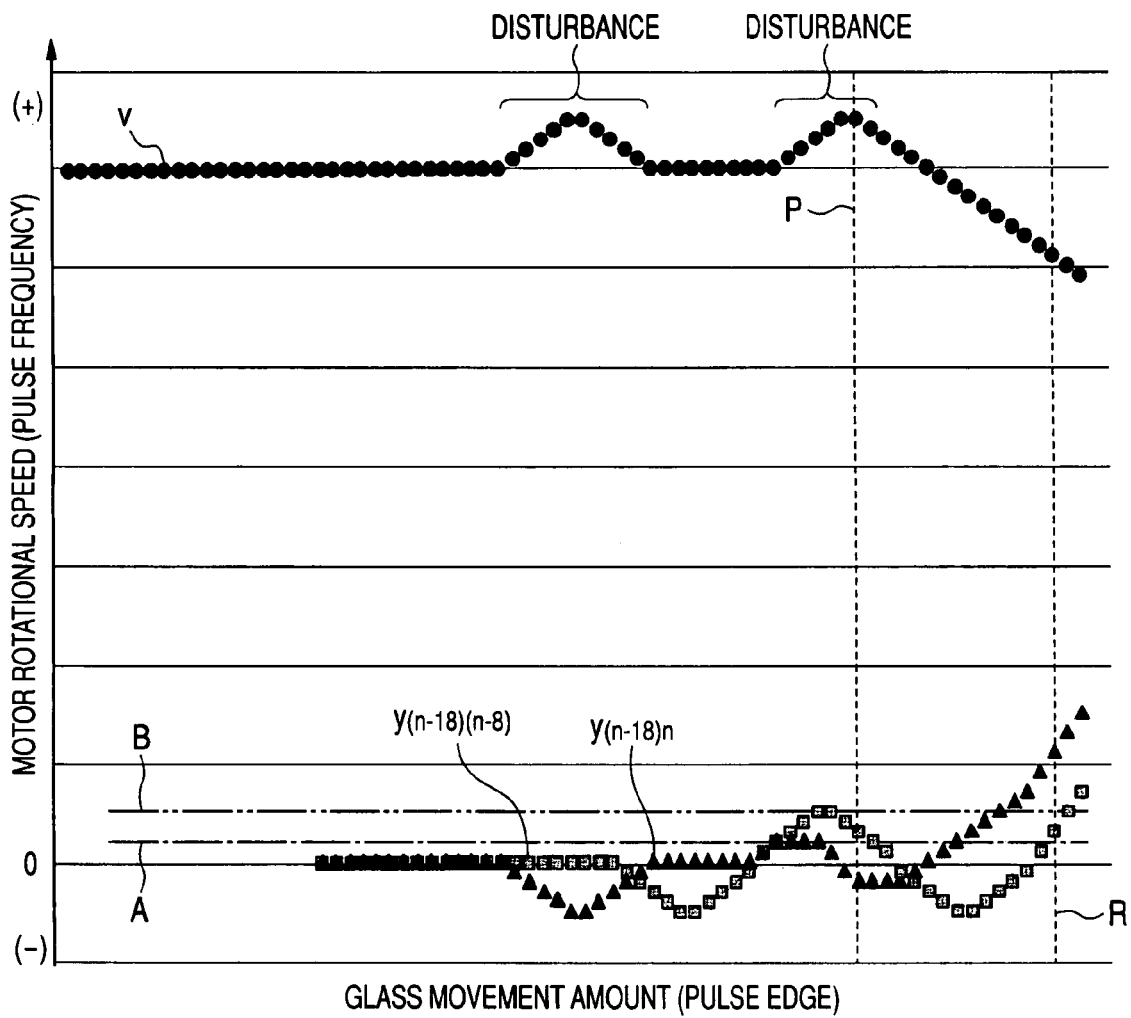
FIG. 18 is a diagram showing the variation states of the rotational speed of the motor and the difference of rotational speeds according to the third embodiment of the present invention.

FIG. 18 is a diagram showing the variation states of the difference between the rotational speed of the motor 3 and the difference of the rotational speeds during the closing operation of the window 100 in the third embodiment. The display style, the detection method and the variation state of the rotational speed v of the motor 3 are the same as those of FIG. 13. The display style and the set values of the threshold values A and B are the same as those of FIG. 13. y(n−18) (n−8) indicated by filled square marks at the lower side represent the difference between the past rotational speed v(n−18) eighteen times before the present rotational speed and the past rotational speed v(n−8) eight times before the present rotational speed. y(n−18)n indicated by filled triangular marks represent the difference between the past rotational speed v(n−18) eighteen times before the present rotational speed and the present rotational speed v(n). As described above, the difference y(n−18) (n−8) is calculated by subtracting the rotational speed v(n−8) from the rotational speed v(n−18). The difference y(n−18)n is calculated by subtracting the rotational speed v(n) from the rotational speed v(n−18). This calculation is made so that the increasing/decreasing trends of the respective differences y(n−18) (n−8) and y(n−18)n with respect to the rotational speed v are set to the same and the variation state of the rotational speed v is made easily comprehensible.

After the step S90 of FIG. 17 is finished, it is judged in the first threshold value/difference comparing and judging portion 93 of FIG. 16 whether the difference yij between the past rotational speeds v(i), v(j) is larger than the first threshold value A (step S91). When the rotational speed v of the motor 3 is a uniform velocity or the rotational speed v is pulsated once by the effect of disturbance as indicated at the left side from the center of FIG. 18, the difference y(n−18) (n−8) corresponding to the difference yij between the past rotational speeds v(i), v(j) in FIG. 18 is equal to the first threshold value A or less. In this case, it is judged in step S91 of FIG. 17 that the difference yij is not larger than the first threshold value A (step S91: NO). The difference yij does not have a weak decreasing trend, the rotational speed v does not have a deceleration trend and no rotation abnormality occurs in the motor 3, so that the rotation abnormality detecting processing is finished, and the processing shifts to the step S15 of FIG. 7 and the step S35 of FIG. 8. Thereafter, since no rotation abnormality of the motor 3 occurs (step S15: NO or step S35: NO), it is judged whether the operation switch 1 is set to the manual-close MC position (step S19 or step S39), and the subsequent processing is executed as described above.

Thereafter, when the rotational speed v of the motor 3 is pulsated at plural times by the effect of disturbance as indicated in front of a P point of FIG. 18, the difference y(n−18) (n−8) becomes larger than the first threshold value A. In this case, the difference yij is judged to be larger than the first threshold value A in step S91 of FIG. 17 (step S91: YES), and it is found that the difference yij has at least a weak decreasing trend. Subsequently, it is judged in the second threshold value/difference comparing and judging portion 94 of FIG. 16 whether the difference yij is larger than the second threshold value B (step S92). As indicated in front of the P point of FIG. 18, if the difference y(n−18) (n−8) is equal to the second threshold value B or less, it is judged in step S92 of FIG. 17 that the difference yij is not larger than the second threshold value B (step S92: NO), and it is found that the difference yij does not have a strong decreasing trend.

Subsequently, it is judged in the second threshold value/difference comparing and judging portion 94 whether the difference yin between the past rotational speed v(i) and the present rotational speed v(n) is larger than the second threshold value B (step S93). As indicated in front of the P point of FIG. 18, if the difference y(n−18)n corresponding to the difference yin between the past rotational speed V(i) and the present rotational speed v(n) is equal to the second threshold value B or less, it is judged in step S93 of FIG. 17 that the difference yin is not larger than the second threshold value B (step S93: NO). Accordingly, the difference yin does not have a strong decreasing trend, the rotational speed v does not have a deceleration trend and no rotation abnormality of the motor 3 occurs. Therefore, the rotation abnormality detecting processing is finished. Thereafter, the processing shifts to the step S15 of FIG. 7 or the step S35 of FIG. 8. No rotation abnormality of the motor 3 occurs (step S15: NO or step S35: NO), and thus it is judged whether the operation switch 1 is set to the manual-close MC position (step S19 or step S39), and the subsequent processing is executed as described above.

Thereafter, when the object Z is stuck in the window 100 at the P point of FIG. 18 and thus the rotational speed v of the motor 3 is continued to be decelerated, the difference y(n−18) (n−8) becomes not more than the second threshold value B and larger than the first threshold value A and the difference y(n−18)n becomes larger than the second threshold value B as indicated by an R point. In this case, it is judged in step S91 of FIG. 17 that the difference yij is larger than the first threshold value A (step S91: YES), it is also judged in step S92 that the difference yij is not larger than the second threshold value B (step S92: NO), and it is also judged in step S93 that the difference yin is larger than the second threshold value B (step S93: YES). Accordingly, the difference yij has a weak decreasing trend, the difference yin has a strong decreasing trend and the present rotational speed v has a strong decreasing trend, so that occurrence of rotation abnormality of the motor 3 is judged (step S80). Then, the rotation abnormality detecting processing is finished, and the processing shifts to the step S15 of FIG. 7 or the step S35 of FIG. 8. Thereafter, the rotation abnormality of the motor 3 occurs (step S15: YES or step S35: YES), and thus it is judged that the object Z is stuck in the window 100 (step S16 or step S36). Then, the motor 3 is reversely rotated to open the window 100 (step S17 or step S37), and the subsequent processing is executed as described above.

On the other hand, if it is judged in step S92 of FIG. 17 whether the difference yij is larger than the second threshold value B (step S92: YES), the difference yij has a strong decreasing trend, and the present rotational speed v has a strong decreasing trend, so that it is judged that rotation abnormality of the motor 3 occurs (step S80) and thus the rotation abnormality detecting processing is finished. Thereafter, the processing shifts to the step S15 of FIG. 7 or the step S35 of FIG. 8, and rotation abnormality of the motor 3 occurs (step S15: YES or step S35: YES), and thus it is judged that the object Z is stuck in the window 100 (step S16 or step S36). Therefore, the subsequent processing is executed as described above.

According to the third embodiment described above, the difference yij between the first past rotational speed v(i) and the second past rotational speed v(j) newer than the first past rotational speed v(i) and the difference yin between the first past rotational speed v(i) and the present rotational speed v(n) vary in accordance with the variation of the rotational speed v of the motor 3, and the reaction of one difference yij between the past rotational speeds v (i) and v (j) to the variation of the rotational speed v is later than the other difference yin. Furthermore, the reaction of the difference yij between the past rotational speeds v(i) and v(j) is later as the past rotational speeds v(i), v(j) are older. Therefore, when the rotational speed v of the motor 3 is temporarily decelerated by the effect of disturbance, the respective differences yij, yin vary so as to approach to the first threshold value A and the second threshold value B while displaced from one another, and then immediately separate from the threshold values A and B. Therefore, there occurs no case where the difference yij is larger than the first threshold value A and also at least one of the differences yij, yin is larger than the second threshold value B, so that erroneous detection of rotation abnormality of the motor 3 can be prevented.

Furthermore, when the rotational speed of the motor 3 is continuously decelerated due to sticking of the object Z into the window 100, the respective differences yij, yin continuously vary so as to approach to the first threshold value A and the second threshold value B and the difference yij becomes larger than the first threshold value and also at least one of the differences yij, yin is larger than the second threshold value B. Therefore, rotation abnormality of the motor 3 can be surely detected.

Furthermore, the two difference threshold values A and B are provided to detect the deceleration trend of the rotational speed v of the motor 3, and occurrence of rotation abnormality of the motor 3 is judged when the difference yij between the rotational speeds v(i) and v(j) which has a late reaction is larger than the smaller first threshold value A and also at least one of the differences yij, yin is larger than the larger second threshold value B. Therefore, as compared with the case where occurrence of rotation abnormality is judged when all the differences exceed a threshold value as in the case of the related art, the judgment frequency is smaller and also the rotation abnormality of the motor 3 can be more rapidly detected. Particularly, with respect to one difference yij, it is judged whether the difference yij is larger than the first threshold value A, and with respect to the other difference yin, it is not judged whether the difference yin is not larger than the first threshold value A. Therefore, the rotation abnormality of the motor 3 can be further rapidly detected.

Figure 19:
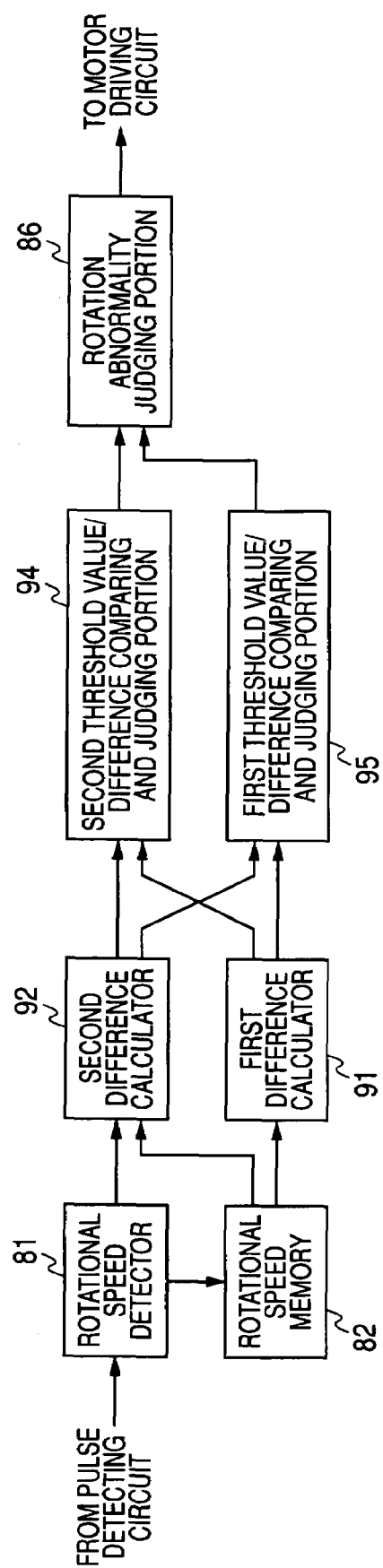
FIG. 19 is a diagram showing rotation abnormality detecting blocks according to a fourth embodiment of the present invention.

FIG. 19 is a diagram of rotation abnormality detecting blocks according to a fourth embodiment of the present invention. In FIG. 19, the same portions as or corresponding portions to those of FIG. 16 are represented by the same reference numerals. In the fourth embodiment, a first threshold value/difference comparing and judging portion 95 is provided in place of the first threshold value/difference comparing and judging portion 93 shown in FIG. 16. The first threshold value/difference comparing and judging portion 95 judges that all the differences calculated by the first difference calculator 91 and the second difference calculator 92 are larger than the first threshold value. The rotation abnormality judging portion 86 judges on the basis of the judgment results of the first threshold value/difference comparing and judging portion 95 and the second threshold value/difference comparing and judging portion 94 whether rotation abnormality of the motor 3 occurs due to the sticking of the object Z in the window 100. The first threshold value/difference comparing and judging portion 95 constitutes an embodiment of the first judging means of the present invention.

Figure 20:
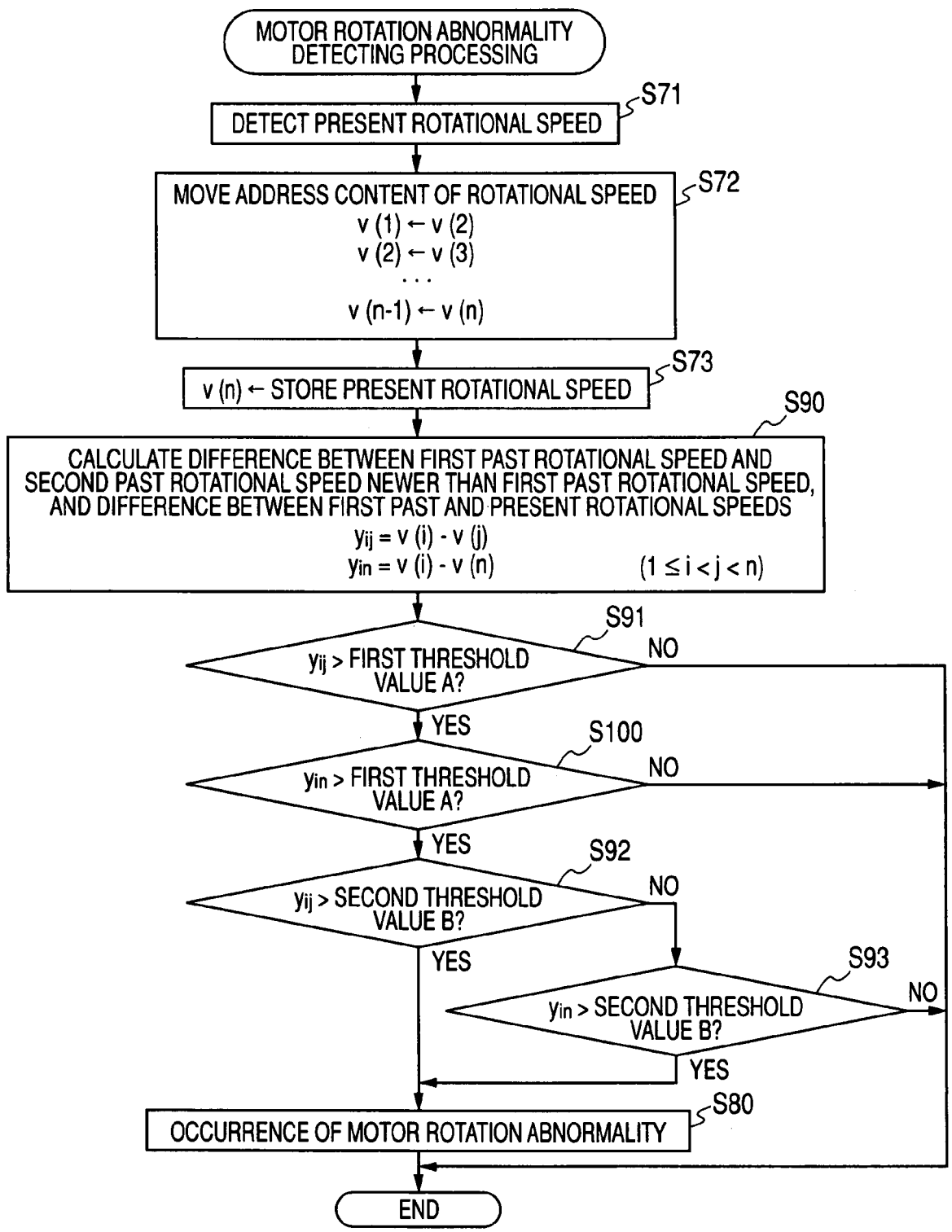
FIG. 20 is a flowchart showing the detailed procedure of the rotation abnormality detecting processing of the motor according to the fourth embodiment of the present invention.

FIG. 20 is a flowchart showing the detailed procedure of a part of the rotation abnormality detecting processing of the motor 3 according to the fourth embodiment. In FIG. 20, the same steps as FIG. 12 and FIG. 17 are represented by the same reference numerals. The closing operation of the window 100 and the storage state of the rotational speed of the motor 3 according to the fourth embodiment are the same as the FIG. 7, FIG. 8 and FIG. 11, and thus these figures are cited as the fourth embodiment.

Figure 21:
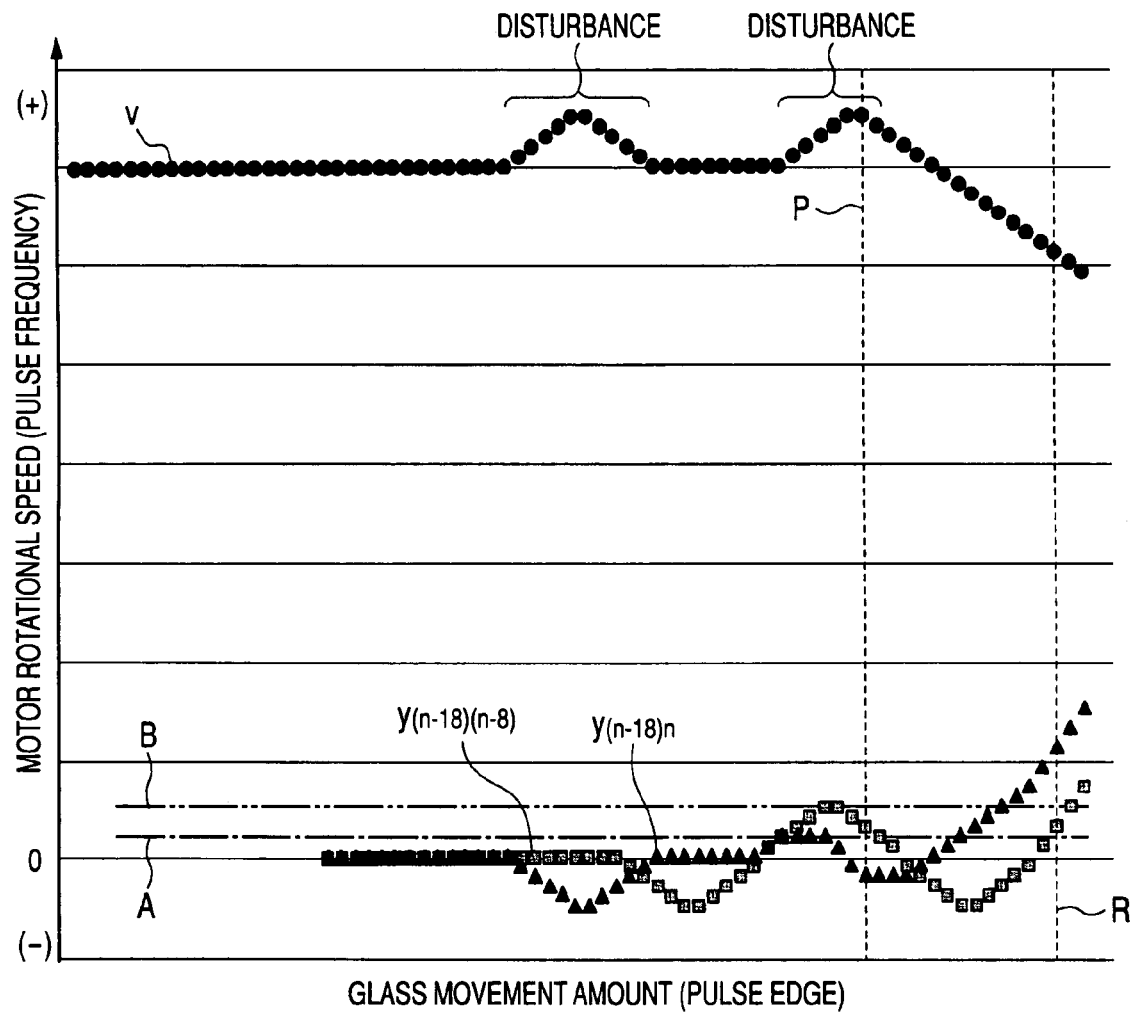
FIG. 21 is a diagram showing the variation states of the rotational speed of the motor and the difference of rotational speeds according to the fourth embodiment of the present invention.

In FIG. 20, the steps S71 to S73 as described above are executed, and the rotational speeds v(1) to v(n) are stored in the storage area of the controller 8 as shown in FIG. 11. Subsequently, the step S90 as described above is executed to calculate the difference yij between the first past rotational speed v(i) and the second past rotational speed v(j) and the difference yin between the first past rotational speed v(i) and the present rotational speed v(n). FIG. 21 is a diagram showing the variation states of the rotational speed of the motor 3 and the difference of the rotational speeds during the closing operation of the window 100 in the fourth embodiment. The display style of the rotational speed v of the motor 3, the detection method and the variation states are the same as those of FIG. 13. The displayed differences y(n−18) (n−8), y(n−18)n, the display style thereof, the calculation method and the variation states are the same as those of FIG. 18. The display style and set values of the threshold values A and B are the same as those of FIG. 13.

After the step S90 of FIG. 20 is finished, it is judged in the first threshold value/difference comparing and judging portion 95 whether the difference yij between the past rotational speeds v(i) and v(j) is larger than the first threshold value A (step S91). When the rotational speed v of the motor 3 is a uniform velocity or the rotational speed v is pulsated by the effect of disturbance as indicated at the left side from the P point of FIG. 21, the difference y(n−18) (n−8) corresponding to the difference yij between the past rotational speeds v(i) and v(j) is equal to the first threshold value A or less in FIG. 21. In this case, it is judged in step S91 of FIG. 20 whether the difference yij is not larger than the first threshold value A (step S91: NO). Furthermore, the difference yij does not have a weak decreasing trend, the rotational speed v does not have a deceleration trend and also no rotation abnormality of the motor 3 occurs, so that the rotation abnormality detecting processing is finished. Thereafter, the processing shifts to the step S15 of FIG. 7 or the step S35 of FIG. 8. Since no rotation abnormality of the motor 3 occurs (step S15: NO or step S35: NO), it is judged whether the operation switch 1 is set to the manual-close MC position (step S19 or step S39), and the subsequent processing is executed as described above.

Thereafter, when the rotational speed v of the motor 3 is pulsated at plural times by the effect of disturbance as indicated in front of the P point of FIG. 21, the difference y(n−18) (n−8) becomes larger than the first threshold value A. In this case, it is judged in step S91 of FIG. 20 that the difference yij is larger than the first threshold value A (step S91: YES). Subsequently, it is judged in the first threshold value/difference comparing and judging portion 95 whether the difference yin between the first past rotational speed v(i) and the present rotational speed v(n) is larger than the first threshold value A (step S100). If the difference y(n−18)n is equal to the first threshold value A or less as indicated in front of the P point of FIG. 21, it is judged in step S100 of FIG. 20 that the difference yin is not larger than the first threshold value A (step S100: NO). Since the difference yin does not have a weak decreasing trend, the rotational speed v does not have a deceleration trend and no rotation abnormality of the motor 3 occurs, the rotation abnormality detecting processing is finished. Thereafter, the processing shifts to the step S15 of FIG. 7 or the step S35 of FIG. 8. Since no rotation abnormality of the motor 3 occurs (step S15: NO or step S35: NO), it is judged whether the operation switch 1 is set to the manual-close MC position (step S19 or the step S39), and the subsequent processing is executed as described above.

Thereafter, when the object Z is stuck in the window 100 at the P point of FIG. 20 and thus the rotational speed v of the motor 3 is continued to be decelerated, the difference y(n−18) (n−8) is not more than the second threshold value B and is larger than the first threshold value A as indicated by an R point, and the difference y(n−18)n is larger than the second threshold value B. In this case, it is judged in step S91 of FIG. 20 that the difference yij is larger than the first threshold value A (step S91: YES), and it is also judged in step S100 that the difference yin is larger than the first threshold value A (step S100: YES). Furthermore, it is judged in step S92 that the difference yij is not larger than the second threshold value B (step S91: YES), and it is judged in step S93 that the difference yin is larger than the second threshold value B (step S93: YES). Accordingly, the difference yij has a weak decreasing trend, the difference yin has a strong decreasing trend and the present rotational speed v has a strong deceleration trend, so that it is judged that rotation abnormality of the motor 3 occurs (step S80). Then, the rotation abnormality detecting processing is finished, and the processing shifts to the step S15 of FIG. 7 or the step S35 of FIG. 8. Thereafter, rotation abnormality of the motor 3 occurs (step S15: YES or step S35:YES), and thus it is judged that the object Z is stuck in the window 100 (step S16 or step S36). Then, the motor 3 is reversely rotated to open the window 100 (step S17 or step S37), and the subsequent processing is executed as described above.

According to the fourth embodiment, when the rotational speed v of the motor 3 is temporarily decelerated by the effect of disturbance, the respective differences yij, yin vary so as to approach to the first threshold value A and the second threshold value B while displaced from each other and then immediately separate from them. Therefore, there is no case where the differences yij and yin are larger than the first threshold value A and also at least one of the differences yij, yin is larger than the second threshold value B, and thus erroneous detection of the rotation abnormality of the motor 3 can be prevented.

When the rotational speed of the motor 3 is continued to be decelerated because the object Z is stuck in the window 100, the respective differences yij, yin continuously vary so as to approach to the first threshold value A and the second threshold value B while displaced from each other, and thus both the differences yij, yin are larger than the first threshold value A and at least one of the differences yij, yin is larger than the second threshold value B, so that the rotation abnormality of the motor 3 can be surely detected. Particularly, with respect to both the differences yij, yin, it is judged whether they are larger than the first threshold value A. Therefore, it can be surely detected that the rotational speed of the motor 3 has a weak decelerating trend, and the rotation abnormality of the motor 3 can be more surely detected.

Furthermore, when both the differences yij, yin are larger than the smaller first threshold value A and also at least one of the differences yij, yin is larger than the larger second threshold value B, occurrence of rotation abnormality of the motor 3 is judged. Therefore, the rotation abnormality of the motor 3 can be more rapidly detected as compared with the case where occurrence of rotation abnormality is judged when all the differences exceed a threshold value as in the case of the related art.

As described above, according to this embodiment, the foregoing description is made to case where the present invention is applied to the device for controlling the opening/closing operation of a window of a door of a vehicle. However, the present invention may be applied to devices for controlling the opening/closing operation of various kinds of opening/closing members such as a sun roof of the ceiling of the vehicle, a rear door of the vehicle, a window of a building, a gate, a door or the like of a building, etc.

What is claimed is:

1. An electric motor controller comprising:
   detecting means for detecting rotational speed of an electric motor;
   storage means for storing the rotational speed detected by the detecting means;
   calculating means for calculating a difference between a present rotational speed output from the detecting means and plural past rotational speeds stored in the storage means;
   first judging means for judging whether the difference between the present rotational speed and a most past rotational speed that is calculated by the calculating means is larger than a first threshold value;
   second judging means for judging whether at least one of plural differences calculated by the calculating means is larger than a second threshold value;
   third judging means for judging based on the judgment results of the first judging means and the second judging means whether rotation abnormality occurs in the electric motor; and
   control means for controlling the electric motor in accordance with the judgment result of the third judging means, wherein
   the first threshold value and the second threshold value are values for detecting a deceleration trend of the rotational speed of the electric motor,
   the first threshold value is set to be smaller than the second threshold value, and
   when both the first judging means and the second judging means make positive judgments, the third judging means judges that rotation abnormality occurs in the electric motor.

2. An electric motor controller comprising:
detecting means for detecting rotational speed of an electric motor;
storage means for storing the rotational speed detected by the detecting means;
calculating means for calculating a difference between a present rotational speed output from the detecting means and plural past rotational speeds stored in the storage means;
first judging means for judging whether each of the plural differences calculated by the calculating means is larger than a first threshold value;
second judging means for judging whether at least one of the plural differences calculated by the calculating means is larger than a second threshold value;
third judging means for judging based on the judgment results of the first judging means and the second judging means whether rotation abnormality occurs in the electric motor; and
control means for controlling the electric motor in accordance with the judgment result of the third judging means, wherein
the first threshold value and the second threshold value are values for detecting a deceleration trend of the rotational speed of the electric motor,
the first threshold value is set to be smaller than the second threshold value, and
when both the first judging means and the second judging means make positive judgments, the third judging means judges that rotation abnormality occurs in the electric motor.

3. An electric motor controller comprising:
detecting means for detecting rotational speed of an electric motor;
storage means for storing the rotational speed detected by the detecting means;
first calculating means for calculating a difference between a first past rotational speed stored in the storage means and a second past rotational speed newer than the first past rotational speed;
second calculating means for calculating a difference between the first past rotational speed and a present rotational speed output from the detecting means;
first judging means for judging whether the difference calculated by the first calculating means is larger than a first threshold value;
second judging means for judging whether at least one of the differences calculated by the first calculating means and the second calculating means is larger than a second threshold value;
third judging means for judging based on the judgment results of the first judging means and the second judging means whether rotation abnormality occurs in the electric motor; and
control means for controlling the electric motor in accordance with the judgment result of the third judging means, wherein
the first threshold value and the second threshold value are values for detecting a deceleration trend of the rotational speed of the electric motor,
the first threshold value is set to be smaller than the second threshold value, and
when both the first judging means and the second judging means make positive judgments, the third judging means judges that rotation abnormality occurs in the electric motor.

4. An electric motor controller comprising:
detecting means for detecting rotational speed of an electric motor;
storage means for storing the rotational speed detected by the detecting means;
first calculating means for calculating a difference between a first past rotational speed stored in the storage means and a second past rotational speed newer than the first past rotational speed;
second calculating means for calculating the difference between the first past rotational speed and a present rotational speed output from the detecting means;
first judging means for judging whether each of the differences calculated by the first calculating means and the second calculating means is larger than a first threshold value;
second judging means for judging whether at least one of the differences calculated by the first calculating means and the second calculating means is larger than a second threshold value;
third judging means for judging based on the judgment results of the first judging means and the second judging means whether rotation abnormality occurs in the electric motor; and
control means for controlling the electric motor in accordance with the judgment result of the third judging means, wherein
the first threshold value and the second threshold value are values for detecting a deceleration trend of the rotational speed of the electric motor,
the first threshold value is set to be smaller than the second threshold value, and
when both the first judging means and the second judging means make positive judgments, the third judging means judges that rotation abnormality occurs in the electric motor.

5. An electric motor controller comprising:
a rotational speed detector adapted to detect rotational speed of an electric motor;
memory adapted to store the rotational speed detected;
a processor; and
instructions executable on the processor to cause the processor to perform:
calculating a difference between a present rotational speed output from the detecting means and plural past rotational speeds stored in the storage means;
judging whether the difference between the present rotational speed and a most past rotational speed that is calculated is larger than a first threshold value;
judging whether at least one of plural differences calculated is larger than a second threshold value;
determining that rotation abnormality occurs in the electric motor when results of the judging are both positive that
the difference between the present rotational speed and a most past rotational speed that is calculated is larger than the first threshold value, and
at least one of plural differences calculated is larger than the second threshold value; and
controlling the electric motor based on whether rotation abnormality occurs in the electric motor,
wherein the first threshold value and the second threshold value are values for detecting a deceleration trend of the rotational speed of the electric motor, and
wherein the first threshold value is set to be smaller than the second threshold value.

* * * * *